Fig. 29

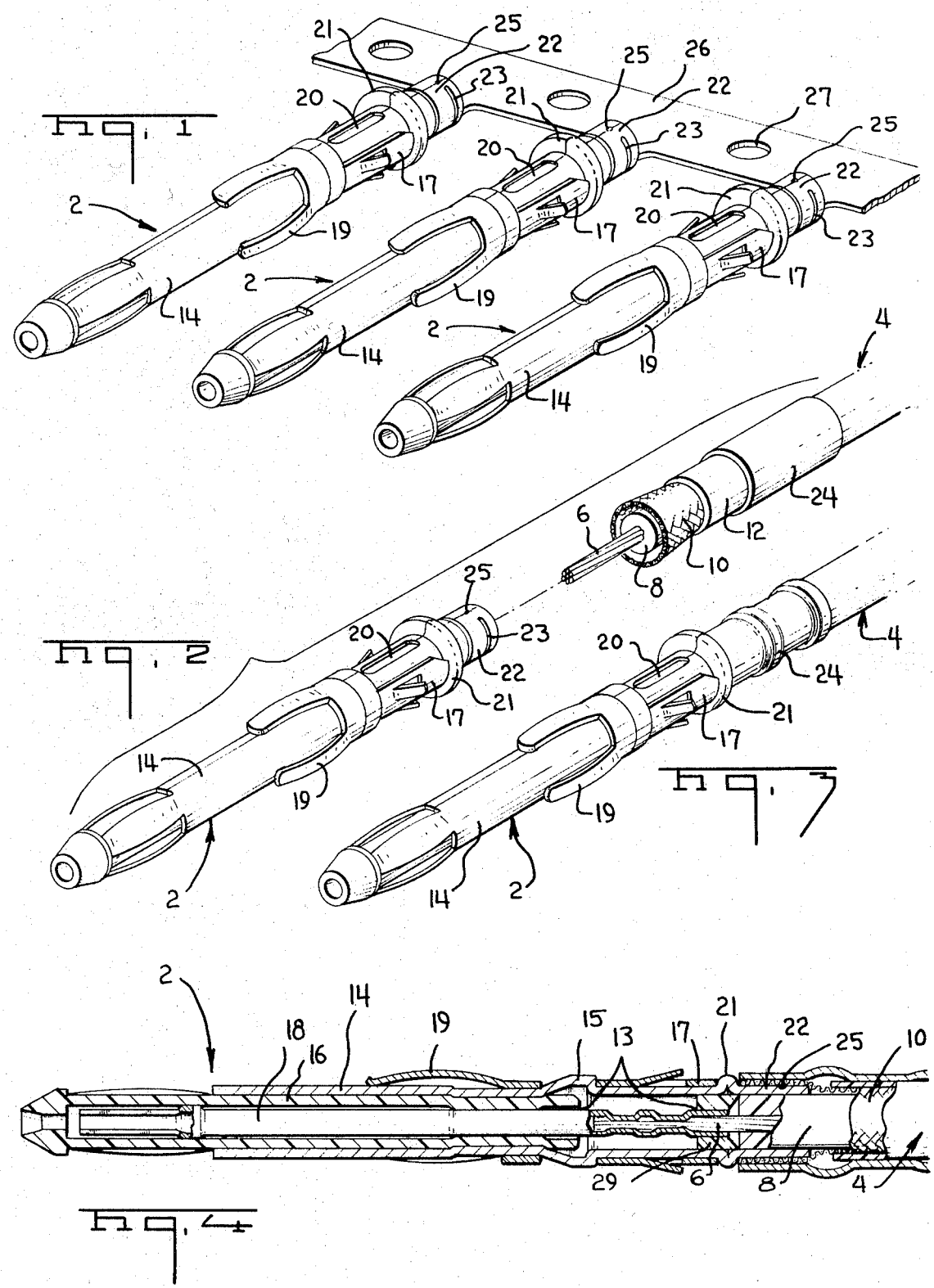

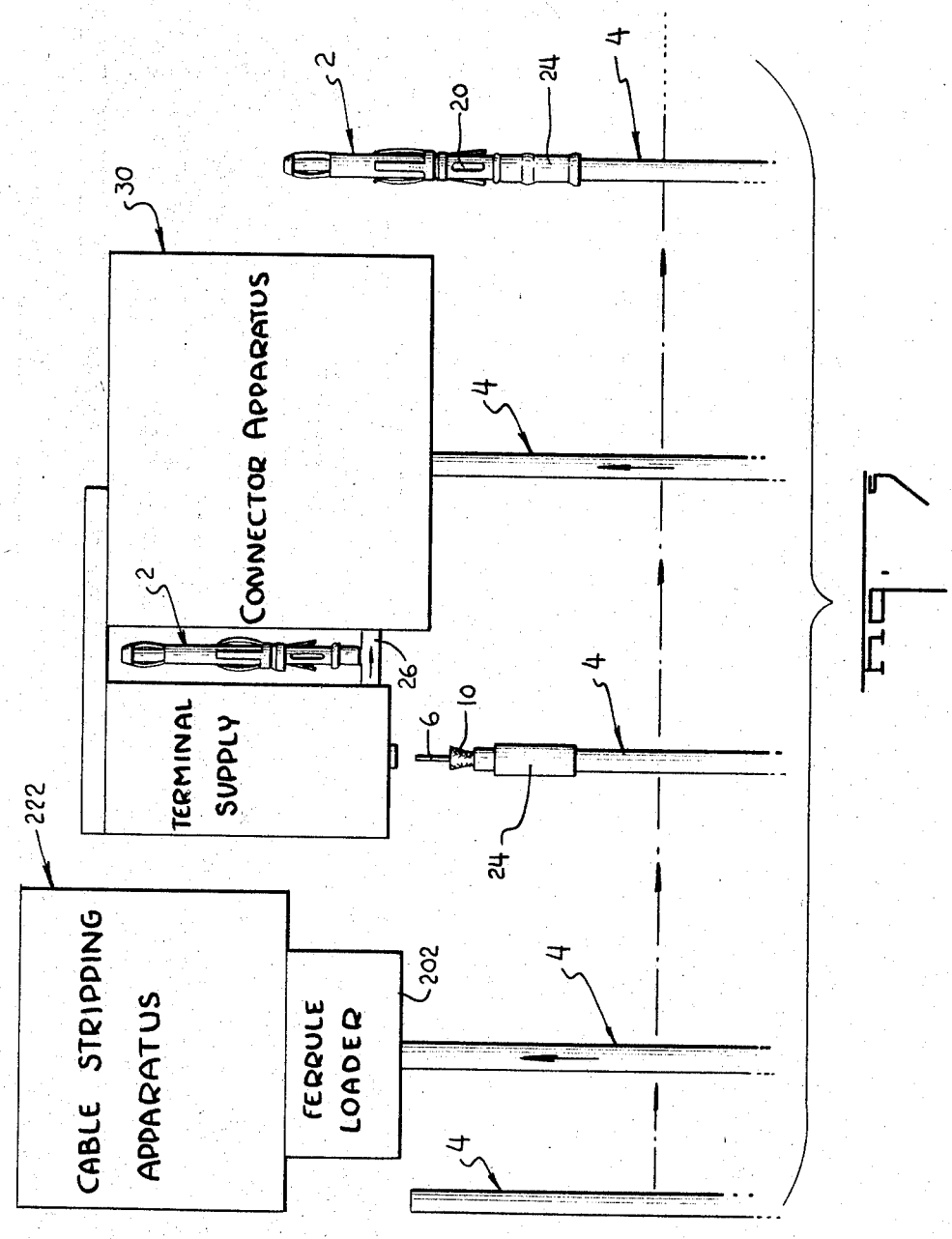

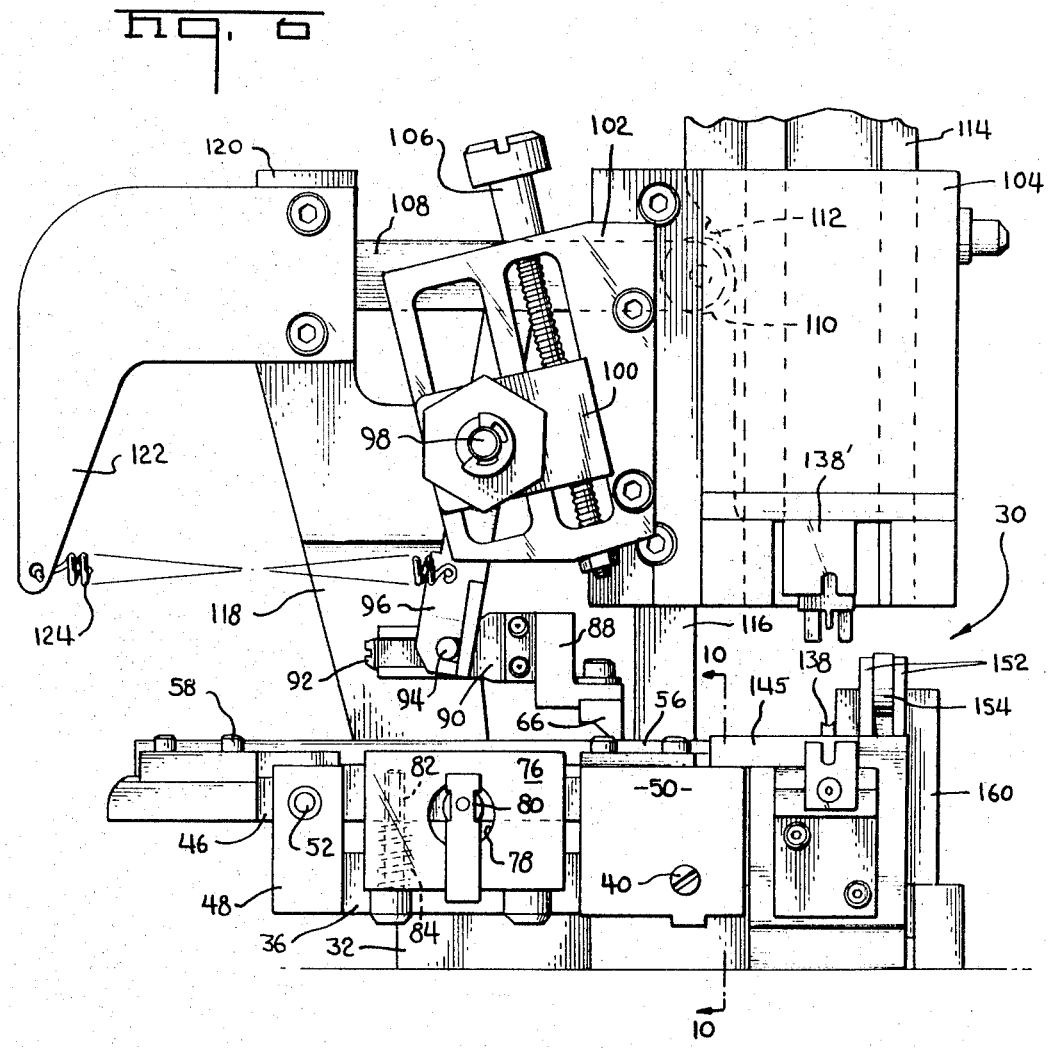
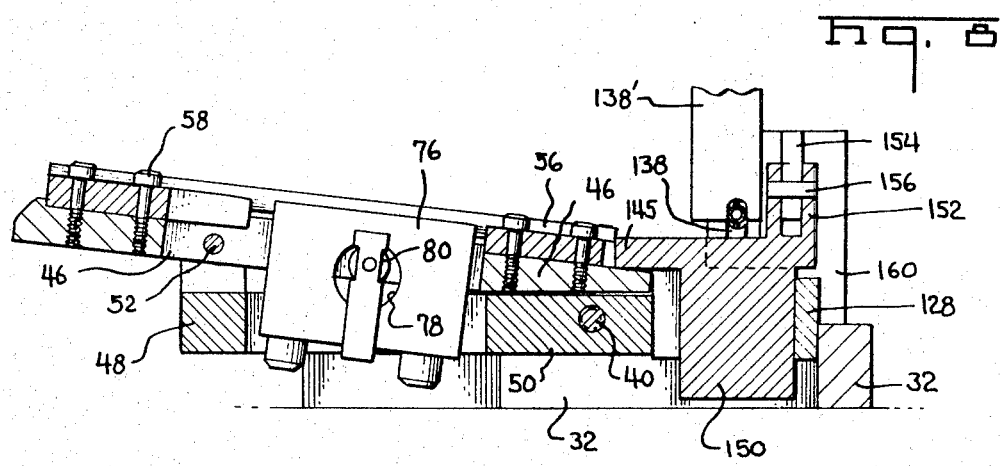

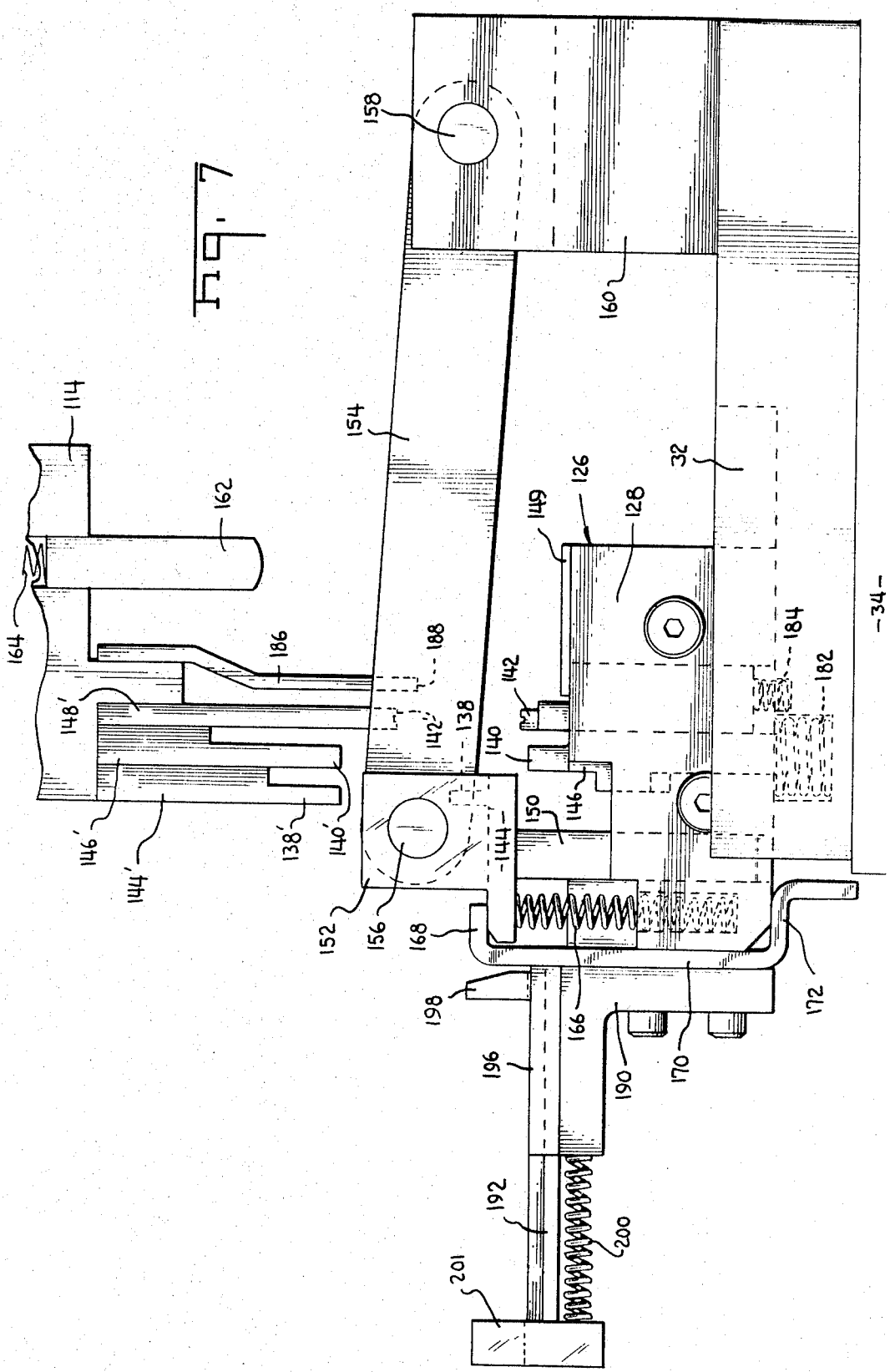

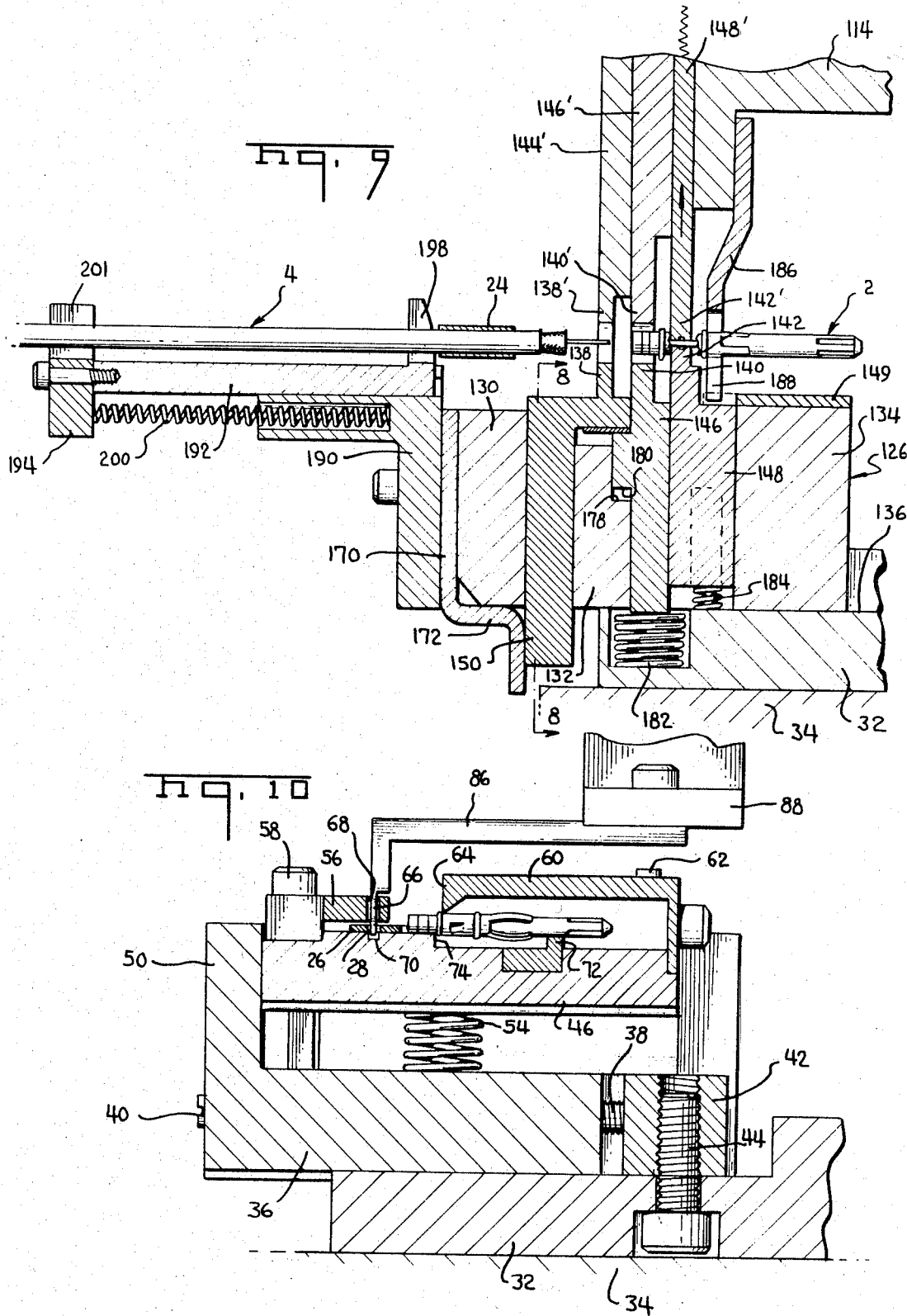

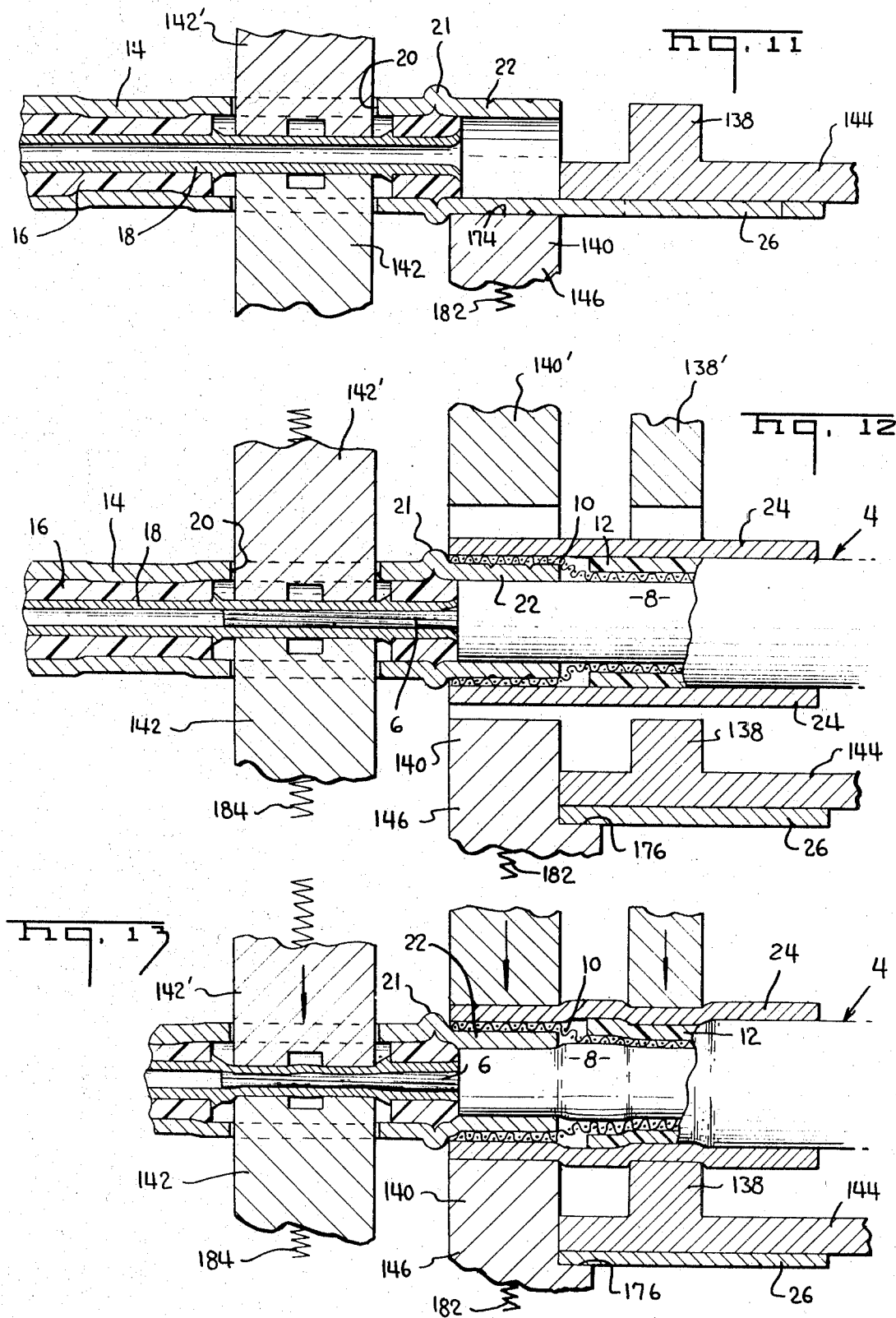

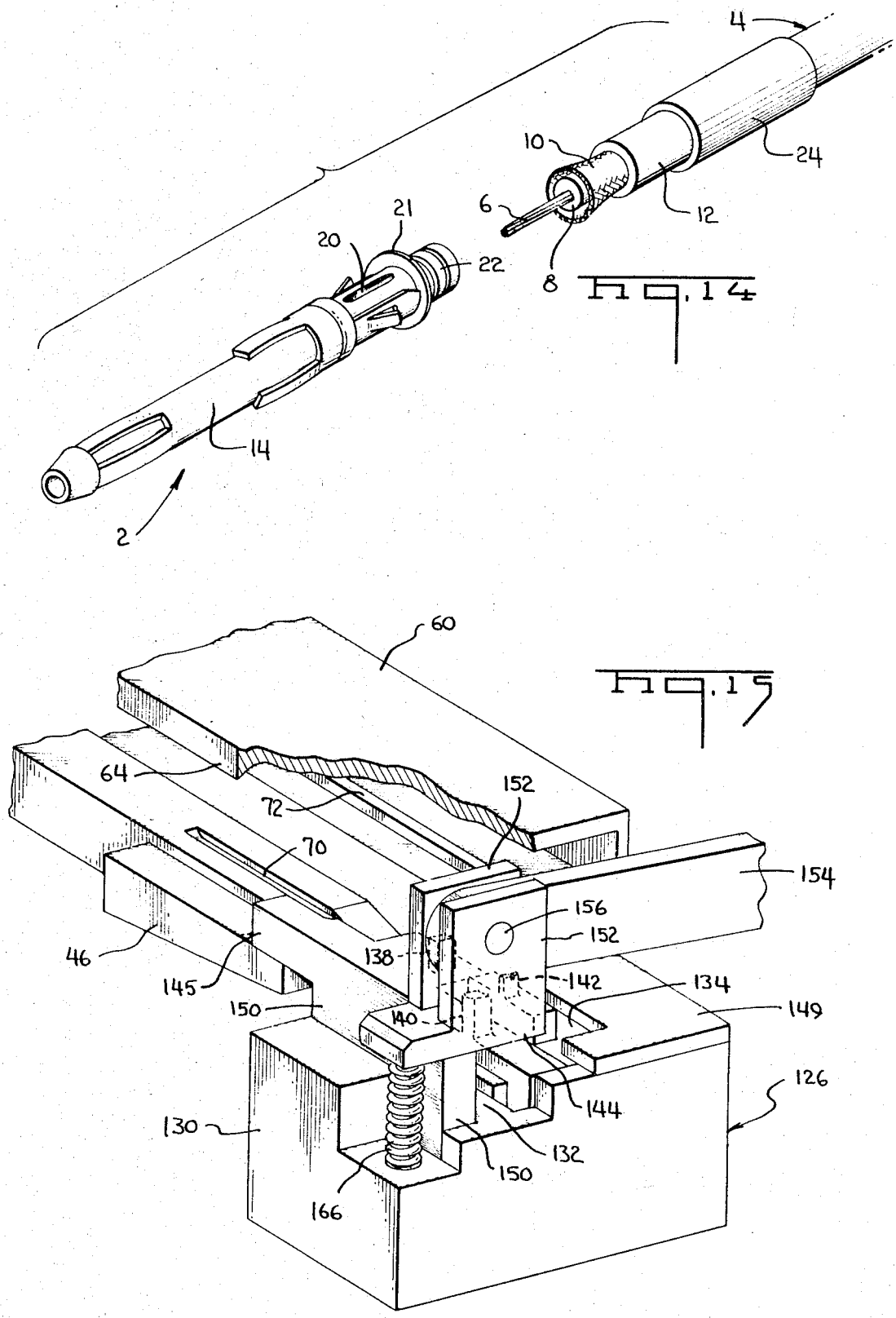

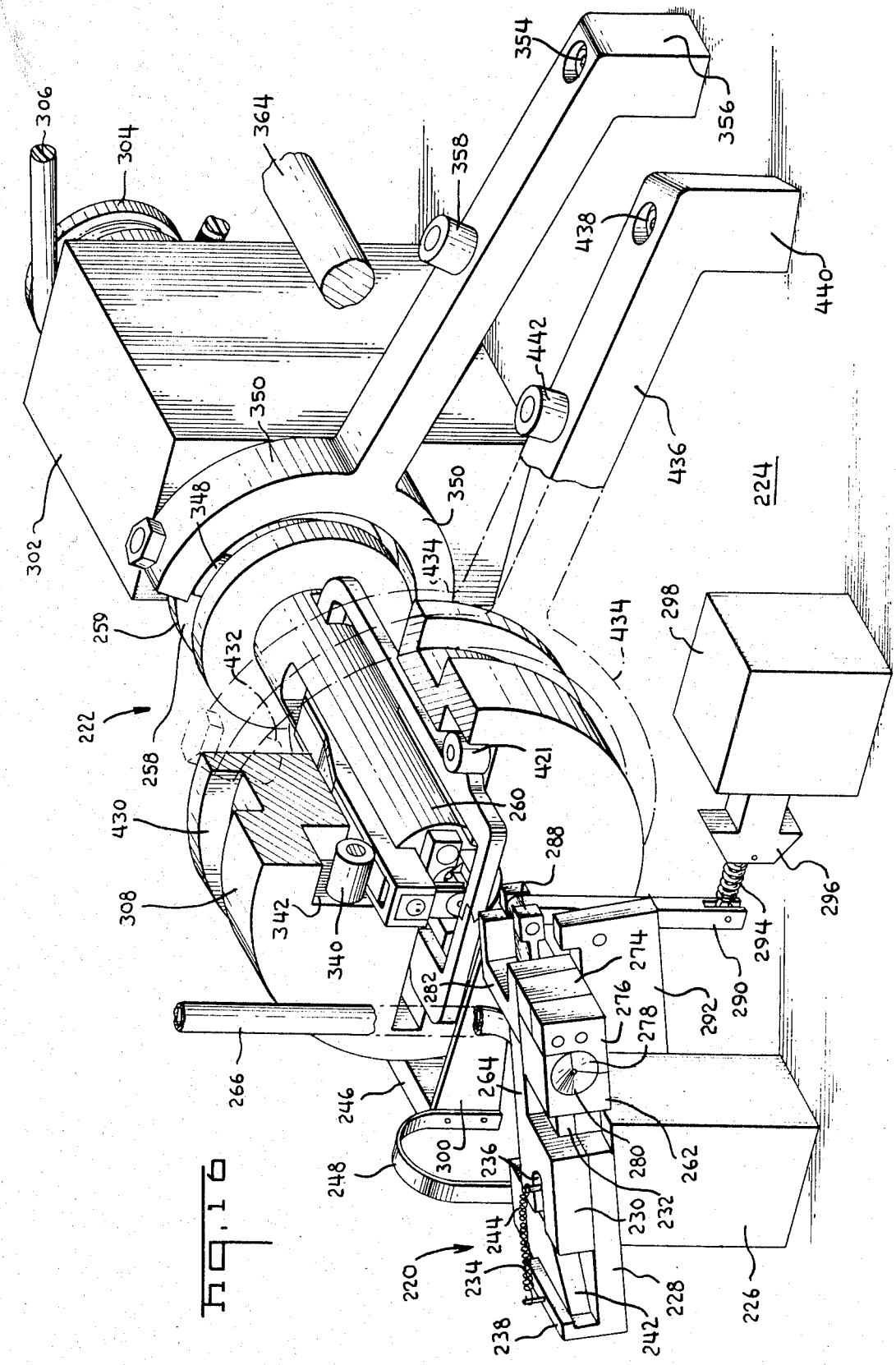

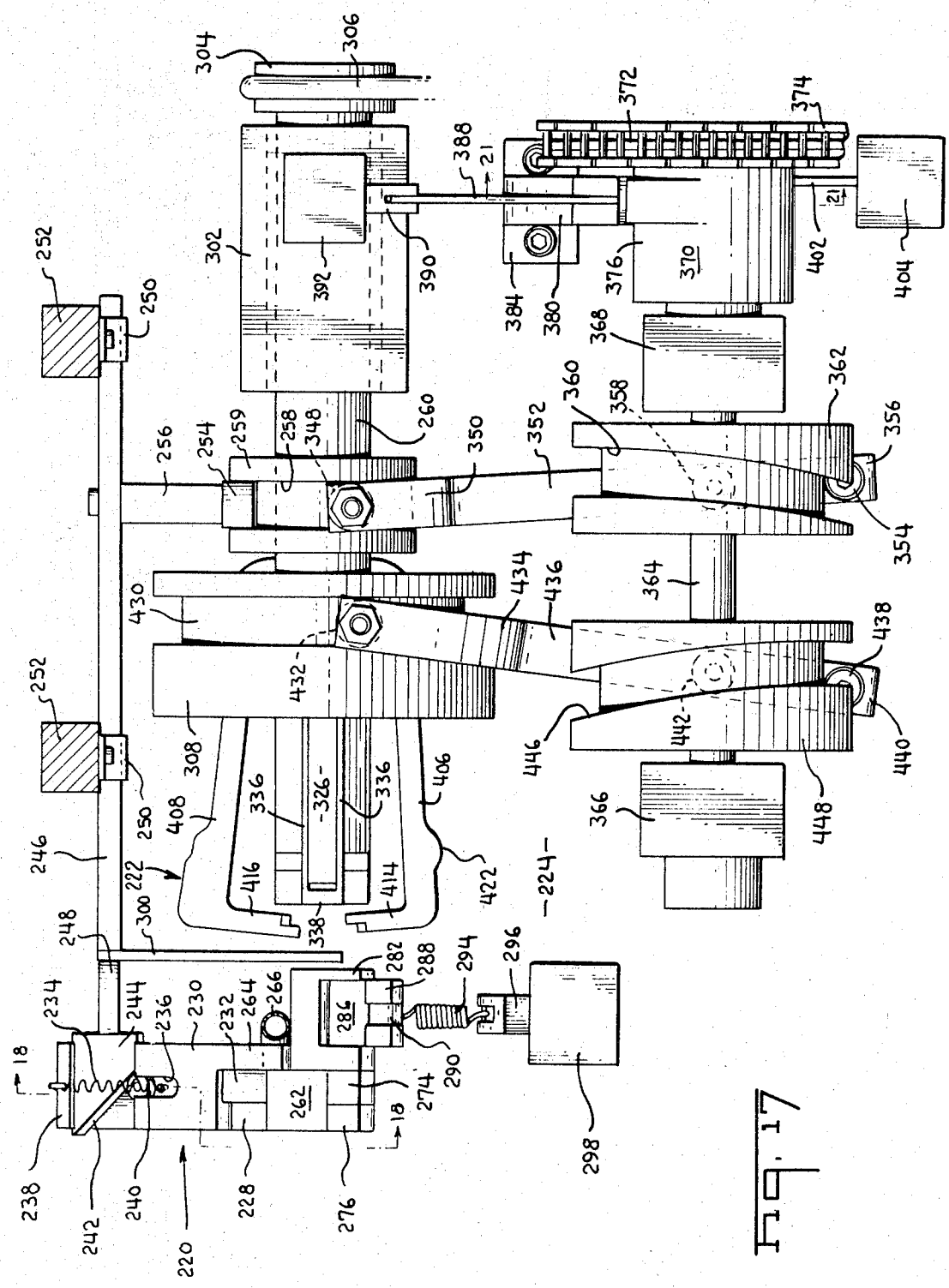

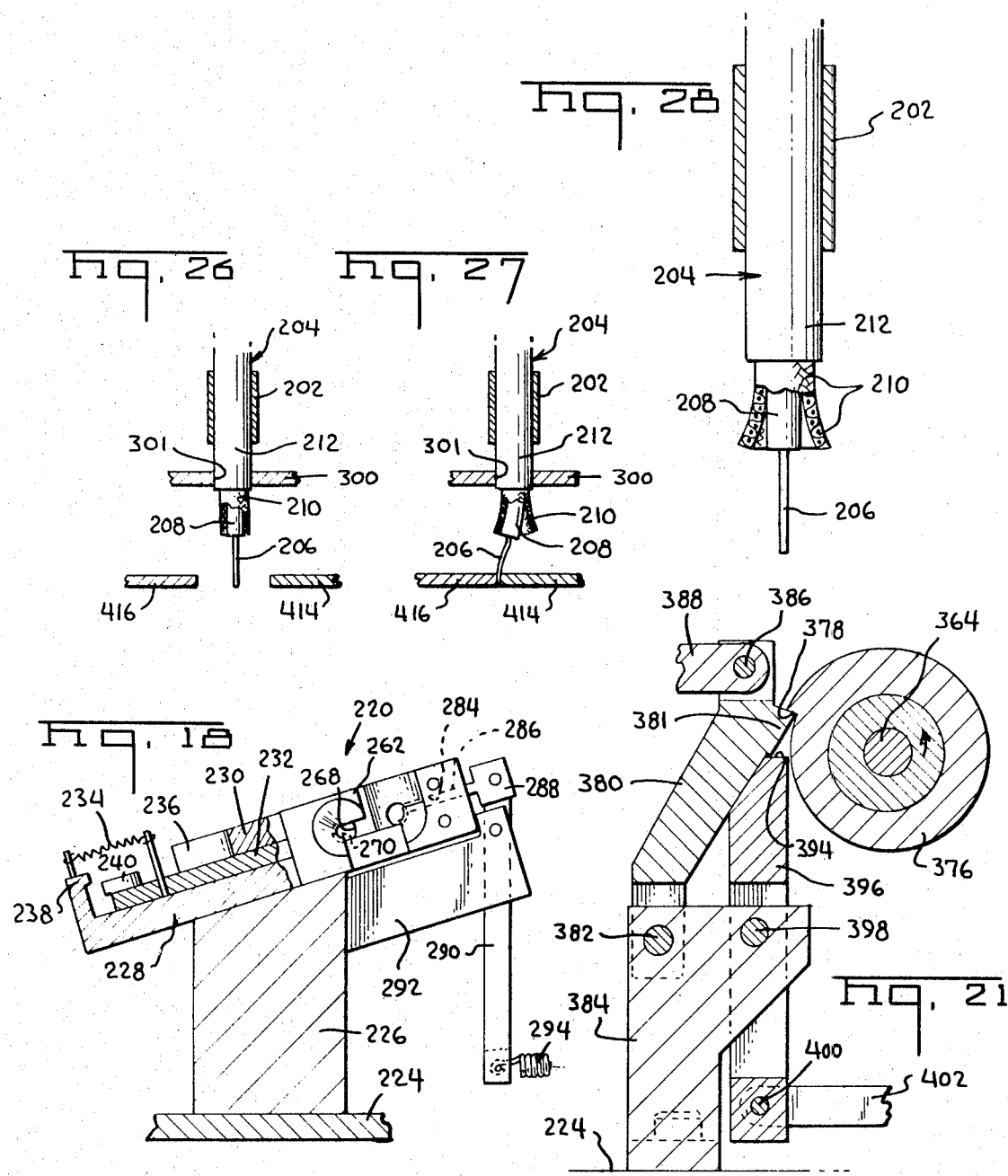

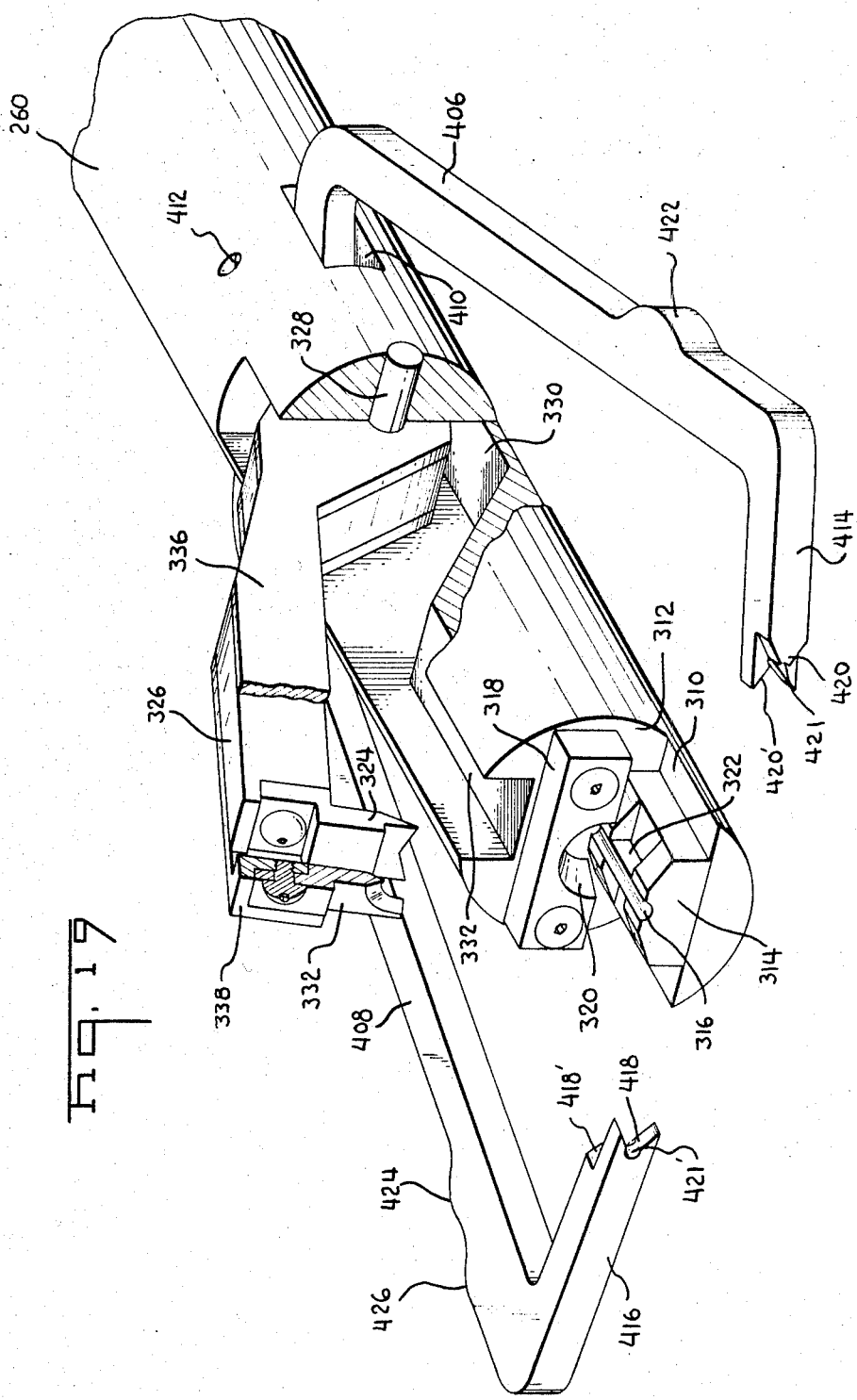

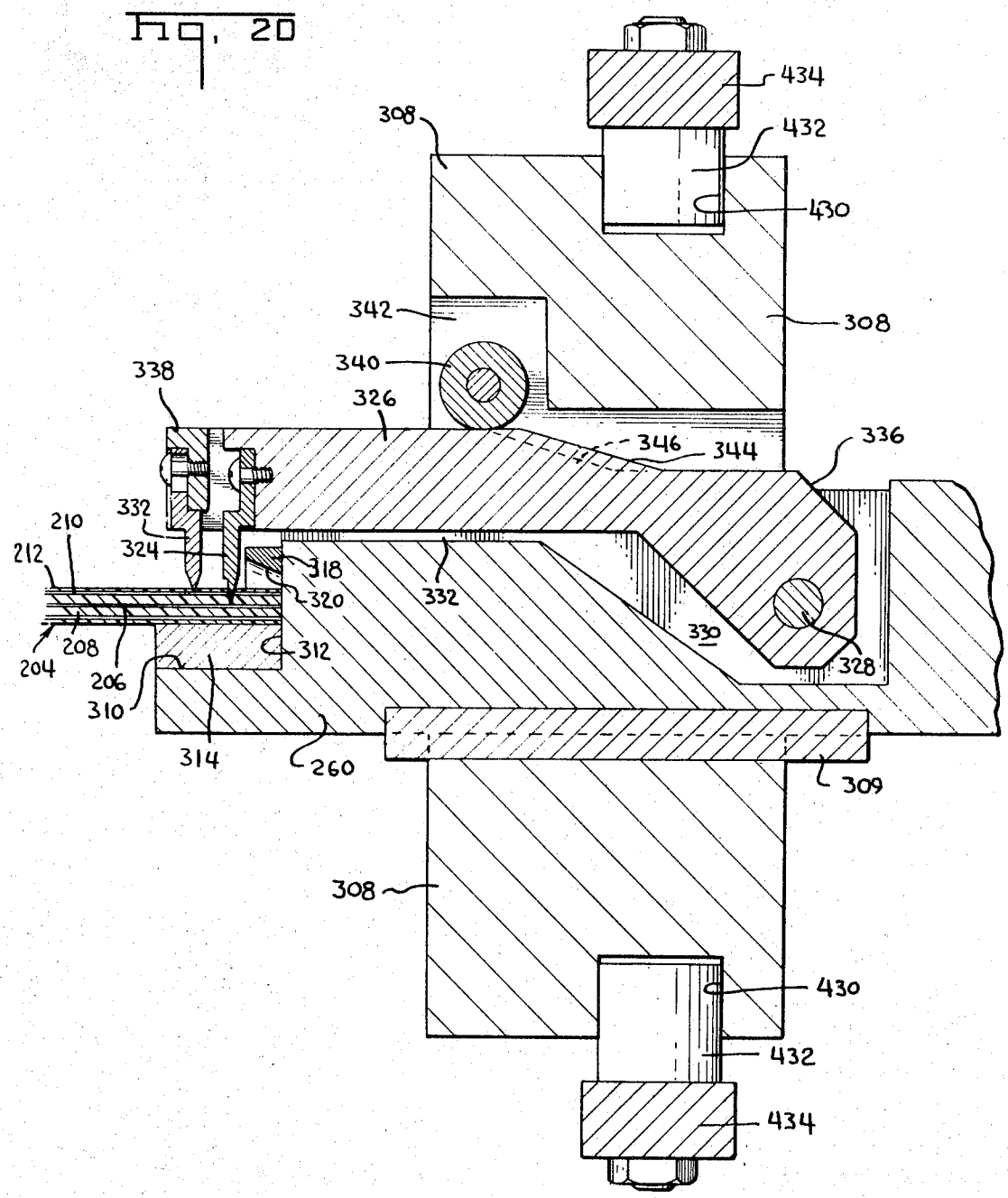

Timing chart: Degrees of rotation of cam shaft 364

| Component | 0°–30° | 30°–90° | 90°–180° | 180°–270° | 270°–360° |
|---|---|---|---|---|---|
| CLAMPING SLIDE 232 | Moves to closed pos. | Dwells in closed position (Fig. 22) and clamps ferrule between surfaces 270, 272 | | | Opens — Dwells in open pos. Fig. 21 |
| SPINDLE 260 | Moves forward to pos. of Fig. 23 | Dwells in forward position (Fig. 23) | Retracts to pos. of Fig. 24 | Dwells in retracted position | |
| MOVEMENT OF CAMMING COLLAR 308 RELATIVE TO SPINDLE 260 | Collar stationary as spindle moves | Moves forward on spindle | Dwells in forward pos. on spindle | Moves further fwd. on spindle to close fingers 406, 408 | Dwells in fwd. position on spindle / Retracts on spindle pos. |
| CUTTING BLADE 324 | Dwells open | Moves into cable | Dwells closed | | Opened — Dwell |
| CUTTING BLADE 332 | Dwells open | Moves into cable | Dwells closed | | Opened — Dwell |
| ARMS 406, 408 | Dwell open | | | Dwell closed while shielding is flaired / Closed | Opened — Dwell open |
| COAXIAL CABLE | End of cable is inserted thru sleeve 4 pos. against spindle during cycle interruption | Cutting blades 324, 332 are moved against spindle cut insulation and shielding | Insulation + shielding stripped from cable end | Center conductor gripped by fingers | Center conductor is twirled and braid is flaired / Ins. ejected |

30° cycle interruption 30°

270° stripped cable end is removed after end of cycle

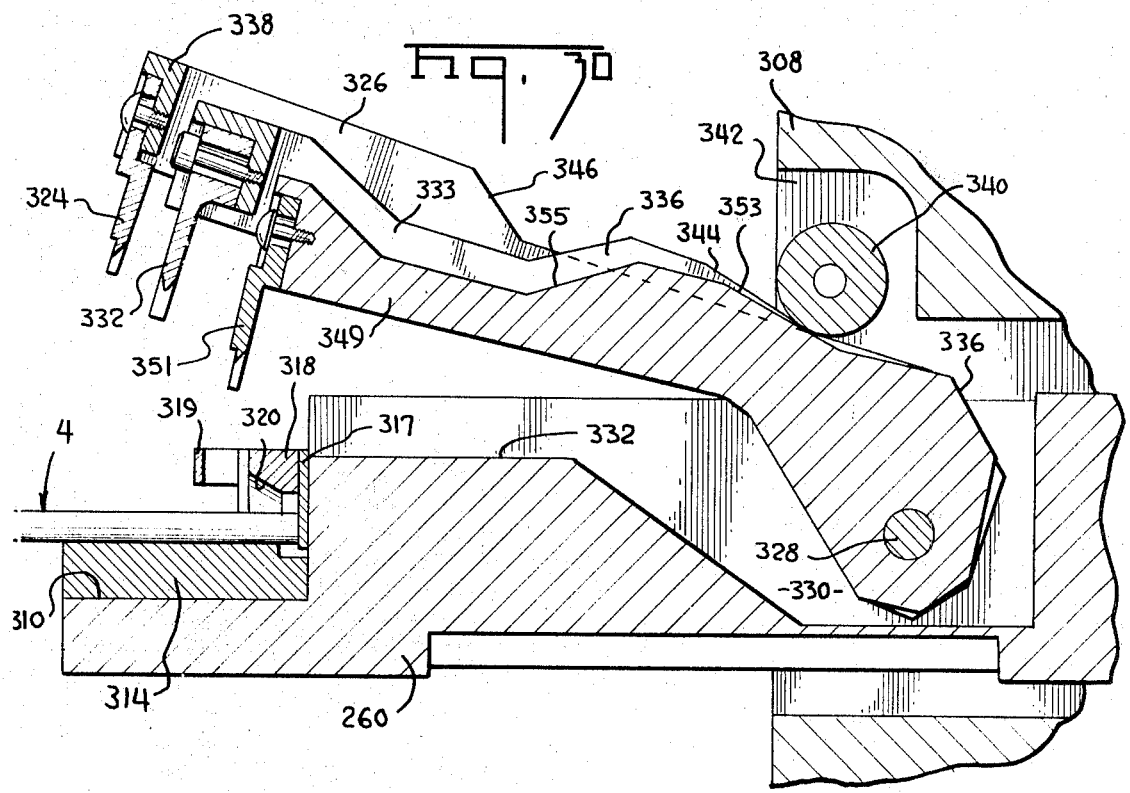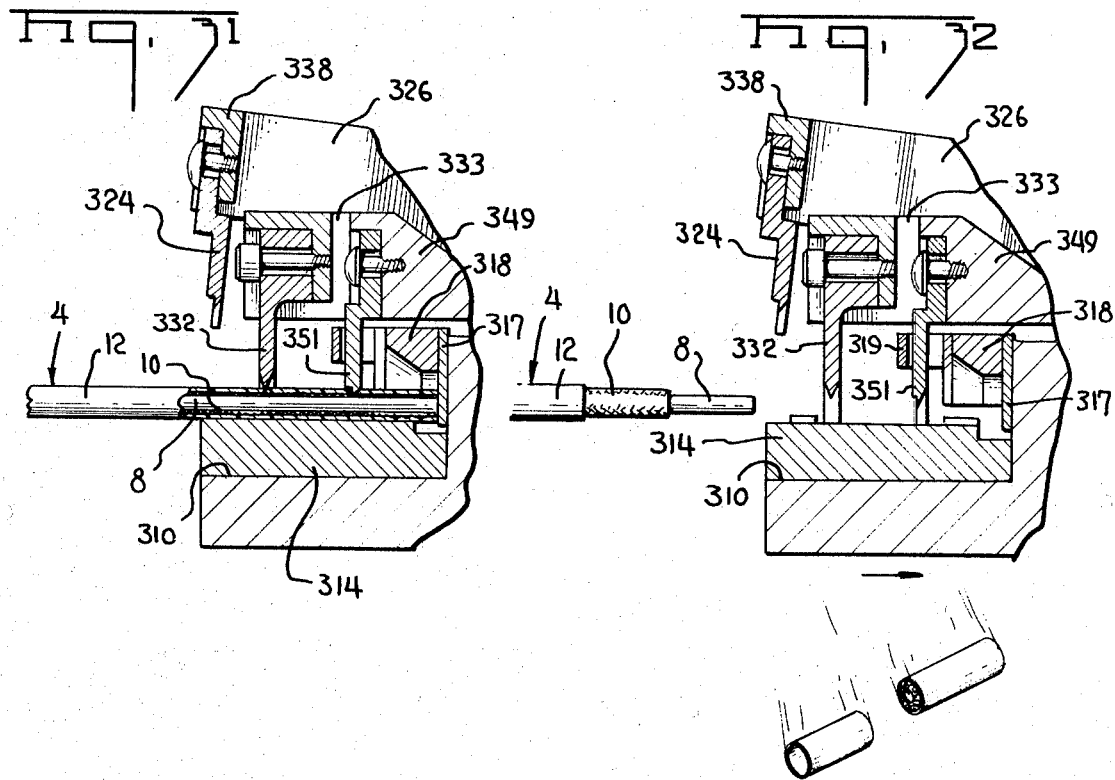

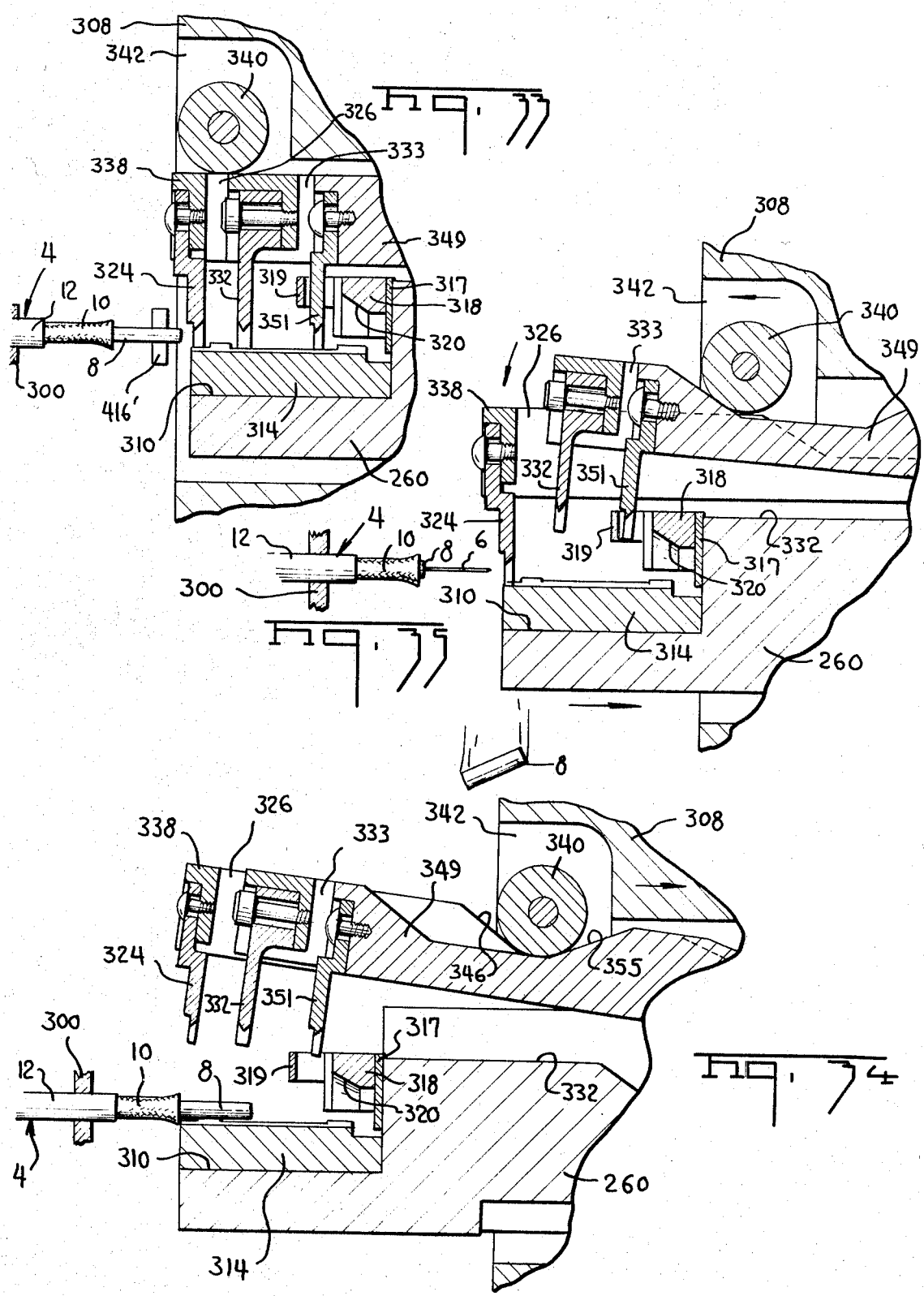

United States Patent Office 3,555,672
Patented Jan. 19, 1971

3,555,672
HIGH SPEED SEMIAUTOMATIC TERMINATION OF COAXIAL CABLE
Michael Francis O'Keefe, Mechanicsburg, Glendon Henry Schwalm, Camp Hill, Robert Stanley Stull, Mechanicsburg, and Coey William Fritz, York, Pa., assignors to AMP Incorporated, Harrisburg, Pa.
Continuation-in-part of applications Ser. No. 678,909, Ser. No. 679,115, and Ser. No. 679,148, all filed Oct. 30, 1967. This application Oct. 29, 1968, Ser. No. 771,542
Int. Cl. H02g 1/12; H01r 43/04; B23p 19/04
U.S. Cl. 29—628
10 Claims

ABSTRACT OF THE DISCLOSURE

A method and apparatus is disclosed for automatic and rapid termination of coaxial connectors to coaxial cable. Each of a series of coaxial connectors are joined together by a carrier strip formed of the sheet metal from which the outer contact portion of each connector is made. Each connector includes an inner contact member having a rear ferrule portion positioned by a dielectric insert within the outer contact portion. The outer contact portion includes access ports leading to the inner contact ferrule portion to permit the insertion of crimping dies therein to crimp the ferrule portion to the inner conductor of a coaxial cable. The crimp ports of each connector are precisely positioned by the carrier strip for machine feeding in a crimping apparatus. Such apparatus includes a first set of indenter dies driven automatically to enter the crimp ports of a given connector and grip but not crimp the ferrule portion therein while the connector is severed from the carrier strip. The severed connector is held by the indenter dies in a proper position for cable attachment. At a separate stripping apparatus, a crimping ferrule is automatically positioned relative to a cable stripping aperture so as to be loaded onto such cable as the cable is inserted for stripping. The cable stripping apparatus then operates to strip portions of the cable exposing the cable inner conductor and the cable outer conductor for termination to a connector. The stripping station also at this time separates the outer conductor of the cable from the dielectric sheath of the cable to facilitate insertion of the cable outer conductor over a rear portion of the connector. The stripped and separated cable having a ferrule loaded thereon is manually inserted into and over the gripped connector held in a proper position by indenter dies. The ferrule is then displaced forwardly to overlie the cable outer conductor and a rear portion of the connector and the indenter dies and additional dies are driven to crimp the connector to terminate inner and outer conductive portions thereof to inner and outer conductive portions of the cable.

RELATED CASES

This case is a continuation-in-part of U.S. patent application, Ser. No. 678,909, now Pat. No. 3,484,936, issued Dec. 23, 1969 entitled Sleeve Assembling and Insulation Stripping Apparatus for Coaxial Cable, by Glendon Henry Schwalm and Coey William Fritz; U.S. patent application, Ser. No. 679,148, now Pat. No. 3,484,922, issued Dec. 23, 1969 entitled Crimping Apparatus for Coaxial Terminals in Strip Form, by Coey William Fritz and Glendon Henry Schwalm, and U.S. patent application, Ser. No. 679,115 entitled Strip Carried Coaxial Connector Method and Means, by Michael Francis O'Keefe and Robert Stanley Stull, all filed Oct. 30, 1967.

BACKGROUND OF THE INVENTION

The present invention relates to termination of multi-part connectors to multi-conductor cable and particularly to termination of coaxial connectors to coaxial cable. The term "coaxial cable" hereinafter used is meant to embrace types of cable utilized to transfer electrical signals in applications where there is at least some need to maintain cable concentricity to avoid signal degradation and to embrace other cable configurations having a function and application identical to that of coaxial cable. Certain use applications, may for example, call for transfer of high frequency pulses or signals having frequency components requiring that the connector of use be approximately matched in impedance to the characteristic impedance of the cable. Typical "coaxial cable" includes an inner conductor surrounded by an inner sheath of insulating and dielectric materials, in turn, surrounded by an outer conductor comprised of metallic wires braided into a tubular configuration and, finally, an outer layer of insulating material which provides a protective covering. Connectors or terminals utilized with cable of this type include inner and outer contact members separately terminated to the inner and outer conductive paths of the cable and electrically separated from each other by a dielectric and insulating insert fitted therebetween. The inner and outer conductive portions of a given connector and a given cable may be mechanically and electrically joined together by clamping, crimping, soldering or welding with these operations being carried out with a given connector disassembled; final assembly of the different connector elements occurring afterwards. With many coaxial connectors, great care must be exercised in order to assure proper placement of each connector element and proper termination of the inner and outer conductive paths of the connector and cable.

The foregoing prior art practice leads to a time consuming procedure which is accomplished by an operator on a one-at-a-time basis, requiring both developed skills and manual dexterity. Prior art connectors having as many as ten separate elements which must be handled, positioned and assembled are presently being used. Installation times, including cable preparation, running as much as five or ten minutes per connector half, are not unusual. For the smaller so-called sub-miniature sizes of coaxial connectors requiring greater care, total installation time and thus applied cost per connection, can be expected to run much higher. While applied cost is a factor, it is secondary to reliability and performance and these factors are directly and adversely affected by the need to assemble and carefully position numerous small elements relative to the fine conductors of miniature coaxial cable.

Perhaps the greatest problem is one of the effect of varying operator skills which leads to applied connectors of varying performance with any slight difference in termination technique being magnified by the shorter wavelengths of high frequency signals.

SUMMARY OF THE INVENTION

The present invention is directed to a method and apparatus for terminating coaxial cable.

It is an object of the present invention to provide a method and apparatus for permanently connecting coaxial cable to coaxial connectors in a rapid and reliable manner minimizing the need for operator skills. It is a further object to provide strip-carried, pre-assembled coaxial connectors which may be machine handled and terminated to coaxial cable. It is yet a further object to provide a supply of coaxial connectors with various elements of each connetcor precisely positioned and oriented in a manner to facilitate machine termination of the inner and outer conductive portions of the connector to similar portions of coaxial cable. It is another object of the invention to provide an improved apparatus for handling and terminating coaxial connectors to coaxial cables. It is still another object to provide an apparatus for feeding and crimping coaxial connectors to separate prestripped coaxial cables. It is yet another object to provide a coaxial connector ferrule feeding device and a cable stripping and flaring device operating automatically upon insertion of a cut, but undressed, cable to load a ferrule and strip a cable in preparation for termination in a connector.

The present invention answers the foregoing objectives and represents an improvement over the prior art through a method which preferably includes special preassembled and carrier-mounted coaxial connectors in conjunction with connector handling and crimping apparatus and a ferrule loading and cable stripping apparatus which preloads a connector crimping ferrule onto a cable during the cable stripping operation. The coaxial connectors are joined together on a carrier strip on a common orientation to facilitate machine feeding. Each connector includes a center contact member having a rear integral ferrule portion adapted to receive the center conductor of a cable for termination thereto. The center contact member is affixed to a dielectric insert in turn affixed to and within an outer contact member of a tubular configuration. The outer contact member is open at the rear end to permit insertion of the cable inner conductor into the ferrule portion of the center contact of the connector. The outer contact member rear end operates as a support portion to receive the outer conductor of a cable terminated thereto by a loose-piece ferrule fitted over the cable outer conductor. The outer contact element of each connector is stamped and formed of sheet metal stock to include a pair of ports leading through the connector insert to the ferrule portion of the inner contact to facilitate access thereto for terminate. The sheet metal stock is punched out to define an integral carrier strip joining a series of connectors together in a manner to provide a common orientation of each connector and to permit reeling for storage, handling and application in the crimping appaartus. One or more spring members are fitted over and attached to each connector as carried in stip form. The connector of the invention is thus completely assembled except for an outer crimping ferrule which is provided as a separate loose piece.

The connector handling and crimping apparatus includes means for feeding a supply of strip-carried connectors into a crimping station including pairs of crimping dies and anvils movable relatively towards and away from each other. One pair of such dies is utilized to crimp the ferrule portion of the center contact of each connector to terminate such to the inner conductor of coaxial cable inserted therein and the other pair of such dies is utilized to crimp the outer ferrule down over the cable outer conductor and over the rear portion of the connector. The connector handling and crimping apparatus has an operating cycle which feeds a leading connector of a strip of connectors into a position wherein the one die-anvil set enters the aligned ports of a connector gripping the ferrule portion of the center contact thereof without deforming such portion to hold and position such connector for later insertion of a cable. While the gripped connector is held in position by the first die-anvil set, the apparatus operates to sever the carrier strip from such connector and displace such carrier strip to a position permitting insertion of a prepared cable into the connector and crimping of such connector. The operating cycle of the apparatus features a delay following severing of the carrier strip from the gripped connector to permit an operator to insert a prepared cable, work a preloaded ferrule into position and then initiate an associated press ram to drive the sets of dies to crimp the inner and outer ferrules of the connector to terminate the cable.

The ferrule loading and stripping apparatus of the invention includes a ferrule feeding device which positions one ferrule at a time from a supply of ferrules adjacent a stripping aperture through which a cut but unstripped cable is inserted. Insertion of the cable into such aperture by an operator threads the cable through the ferrule and into a stripping means of the rotary type which has stripping blades staggered to strip the cable to different depths so as to expose a portion of the center conductor and a portion of the cable outer conductor. The stripping apparatus also includes a mechanism which separates the inner and outer conductor of the cable radially so that after the cable is stripped and withdrawn from the apparatus the ferrule will be positioned on the cable behind the dressed end thereof. The flared or separated outer conductor is shaped in this process for ease of insertion over the rear end of a connector held in position in the crimping apparatus.

In the drawings:

FIG. 1 is a perspective view showing a segment of carrier strip mounted coaxial connector halves, enlarged from actual size, in accordance with one aspect of the invention;

FIG. 2 is a perspective showing one of the connectors of FIG. 1 aligned with a dressed and prepared coaxial cable spaced therefrom in a position preparatory to attachment;

FIG. 3 is a perspective view of the connector and cable of FIG. 2, following attachment;

FIG. 4 is a longitudinal section of the connector as attached to the cable, shown in FIG. 3;

FIG. 5 is a plan and schematic view depicting the method of the invention relative to a supply of connector halves like that shown in FIG. 1 in conjunction with connector handling and terminating apparatus and ferrule loading and cable stripping apparatus;

FIG. 6 is a frontal view of a preferred embodiment of the connector handling and crimping apparatus showing the positions of the apparatus parts at the beginning of an operating cycle;

FIG. 7 is a side view on an enlarged scale of the apparatus of FIG. 6;

FIG. 8 is a fragmentary view showing the lower portion of the apparatus of FIG. 6 illustrating the positions of the parts in an intermediate stage of the operating cycle, the view being taken along the lines 8—8 of FIG. 9;

FIG. 9 is a sectional view taken through the crimping tooling of the apparatus of FIG. 6 showing the positions of the parts at the time of cycle interruption, that is, after the leading connector half of a strip of connector halves has been severed from the strip and prior to its insertion of a stripped cable into the connector half held in the crimping tooling;

FIG. 10 is a view taken along the lines 10—10 of FIG. 6;

FIG. 11 is a fragmentary cross-sectional view on an enlarged scale, showing the positions of the crimping dies and anvils of the apparatus at the beginning of an operating cycle;

FIGS. 12 and 13 are views similar to that of FIG. 11, but showing the positions of apparatus elements at successive stages of the operating cycle;

FIG. 14 is a perspective view showing one connector half and cable just prior to attachment;

FIG. 15 is a fragmentary perspective view showing the crimping dies and anvils and a manner in which they are mounted in the apparatus utilized for handling and crimping connectors;

FIG. 16 is a perspective view, with some parts broken away and some parts omitted in the interest of clarity, of one embodiment of the ferrule feeding and cable stripping apparatus of the invention;

FIG. 17 is a top plan view of the embodiment of FIG.

Figure 22:
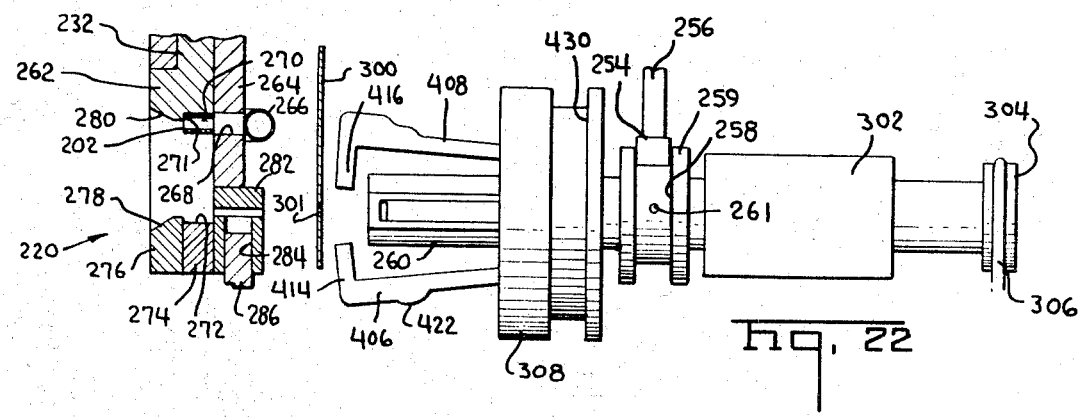
Figure 23:
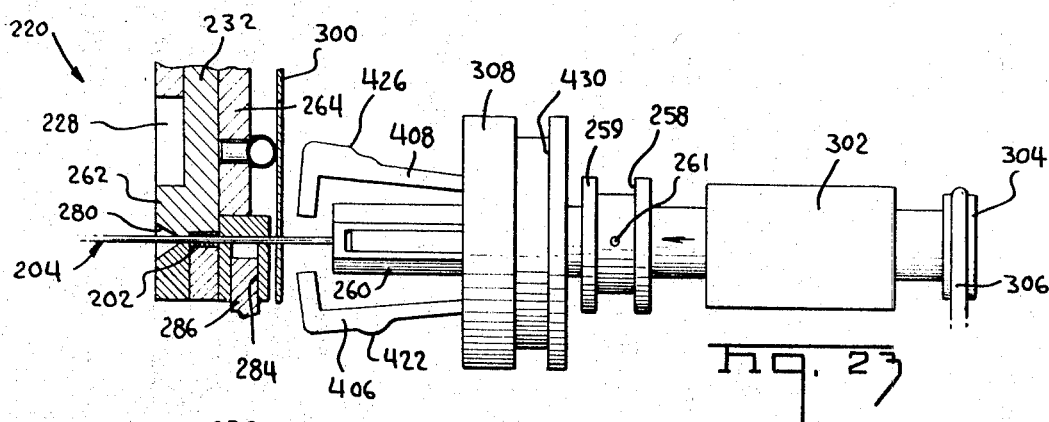
Figure 24:
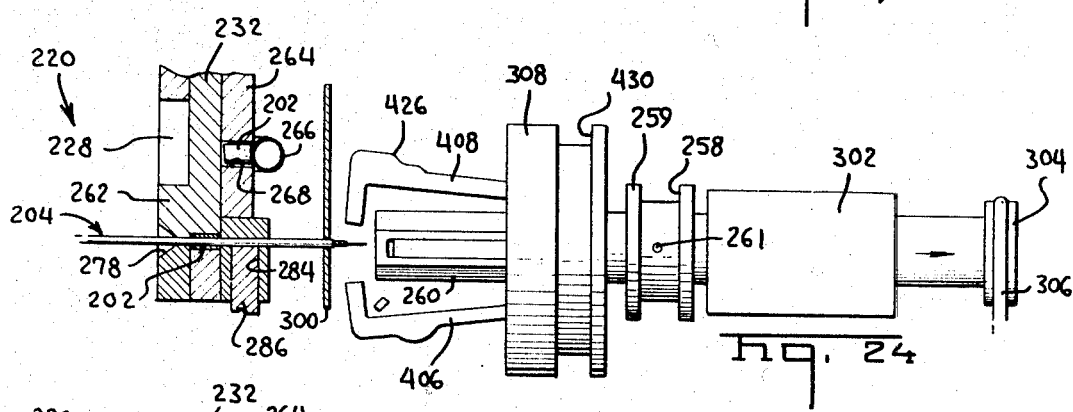
Figure 25:
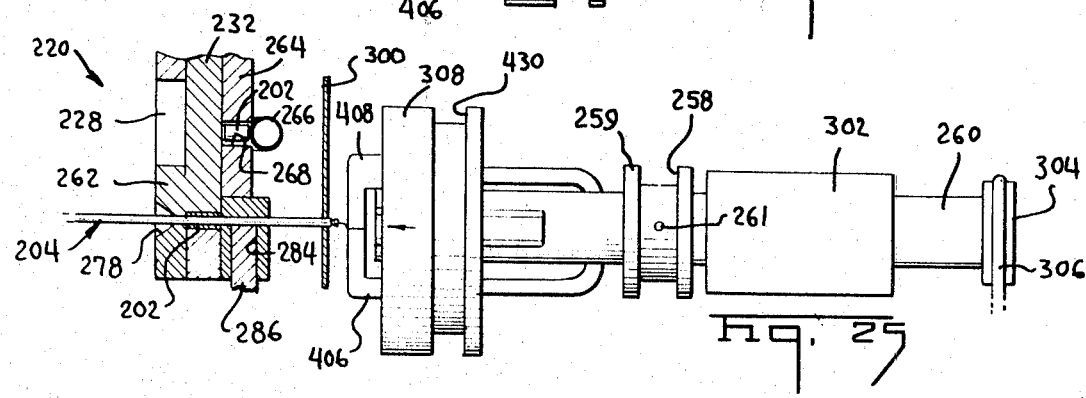

16 showing the positions of the parts at the beginning of an operating cycle;

FIG. 18 is a view taken along the lines 18—18 of FIG. 17;

FIG. 19 is a fragmentary perspective view showing a spindle on which the cutting blades and flaring mechanism of a stripping apparatus are mounted;

FIG. 20 is a sectional side view of the forward end of the spindle showing the cutting blades in a closed position relative to an inserted cable;

FIG. 21 is a view taken along the lines 21—21 of FIG. 17;

FIG. 22 is a fragmentary plan view, partially in section, of the ferrule feeding mechanism and the spindle, this view showing the positions of the parts at the beginning of an operating cycle;

FIGS. 23, 24, and 25 are views similar to that of FIG. 22 but showing the positions of the parts at different stages of an operating cycle;

FIG. 26 is a fragmentary view showing the end of a stripped cable in the stripping apparatus at a time immediately before the flaring operations;

FIG. 27 is a view similar to that of FIG. 26 illustrating the flaring operation;

FIG. 28 is a view of the end portion of the cable which has been prepared for attachment to a connector;

FIG. 29 is a timing diagram which explains the sequence of operation of the embodiment of the stripping apparatus of the invention disclosed relative to FIGS. 16–28;

FIG. 30 is a sectional side view of the forward end of an alternative cable stripping apparatus in an open position with an unstripped cable inserted therein;

FIG. 31 is a view of the end of the structure of FIG. 30 closed on the cable to effect a first stripping step;

FIG. 32 is a view of the structure of FIG. 31 with the cable partially stripped and removed to a position for a braid flaring operation;

FIG. 33 is a view of the structure of FIG. 32 showing the braid flaring operation and structure;

FIG. 34 is a view of the end of the structure of FIG. 30 with the flared cable being reinserted for a secondary stripping operation; and FIG. 35 is a view of the structure of FIG. 34 following the secondary stripping operation.

DESCRIPTION OF THE PREFERRED EMBODIMENT OF THE INVENTION

STRIP CARRIED COAXIAL CONNECTOR

Referring now to FIG. 1, three of a series of coaxial connector halves 2 are shown joined to a common carrier strip 26. The carrier strip 26 is in the illustrative embodiment formed of a portion of the thin sheet metal blanked out to define the outer conductive portion of each connector half. Strip 26 includes a series of feed holes 27 which may be utilized to index the strip and thereby a series of joined connector halves for production assembly of the connector halves and later for machine handling and termination in a manner to be described. The arrangement shown in FIG. 1 is capable of being reeled so that a relatively large supply of connector halves may be wrapped upon a common reel for storage, transport, and use with application tooling. Reference may be had to U.S. patent application, Ser. No. 679,115, to Michael F. O'Keefe et al., filed Oct. 30, 1967, for a disclosure of a preferred embodiment of strip-carried connector halves similar to those shown in this application.

FIGS. 2 and 3 show a connector half 2 prior to and after termination to a coaxial cable 4, respectively. FIG. 2 shows half 2 in alignment with a stripped coaxial cable preparatory to attachment of such cable onto the connector half. The cable 4 may be seen to include a center conductor 6 surrounded by a dielectric sheath 8 and an outer conductor 10 comprised of metal wires woven together as a braid. An outer protective insulating sheath shown as 12 is made to surround the outer conductive structure of the cable. FIG. 2 shows a ferrule 24 which is preferably of malleable metal and FIG. 3 shows such ferrule displaced forwardly and crimped inwardly to terminate the cable outer conductor 10 to a rear portion of the outer conductive structure of the connector half.

Each connector half 2 may be seen in FIGS. 1–4 to be comprised of an outer tubular metal shell 14 which extends from an end joined to strip 26 by a web of metal to an end having a series of outwardly bowed spring fingers. These spring fingers engage and contact the outer conductive shell of a mating receptacle, not shown. As shown in FIG. 1, 2, and 4, the rear portion of shell 14 is circular and has an outer diameter only slightly larger than the inner diameter of a cable outer conductor 10 so that the cable outer conductor may be slipped thereover without undue expansion. The inner diameter of rear portion 22 is approximately equal to the outer diameter of the cable dielectric 8 so as to receive the cable inner conductor 6 and sheath 8 inserted therein in a relatively easy sliding fit. The outer surfaces of 22 preferably includes a series of slight annular indentations shown as 23, which serve to break up oxides on the outer conductor 10 as it is crimped inwardly against 22 and further to provide an improved holding against pull-out tending to separate the connector half from the cable. As shown in FIGS. 1 and 2, the seam left by forming shell 14 out of flat stock is tightly closed along the shell length. In the rear portion 22, the seam is joined together as by a weld spot 25 which prevents deformations of 22 under the force of crimping ferrule 24 to join the cable outer conductor to the connector half. Reference may be had to the previously mentioned application of O'Keefe for details of the preferred weld structure in this region of the connector.

Forwardly of 22 is an enlarged flange portion 21 which serves as a stop to properly position the cable outer conductor and ferrule 24 during displacement of such elements into a proper position for termination. Immediately ahead of 21 shell 14 is made to include a pair of ports 20, the upper port being shown in FIGS. 1–3. The lower port 20 is directly opposite the port shown as can be seen in section of FIG. 4. Ahead of ports 20 is a further flange portion shown as 15 which serves with 21 to position a locking spring 17 snapped onto shell 14 to hold a connected half within the aperture of a plastic block, not shown, utilized for multiple housing of connector halves. The spring 17 is blanked out underneath to expose the lower aperture 20 or entry of dies through shell 14. Immediately ahead of 15 is a spring member 19 which serves to center the connector half within an aperture of a housing block.

As can be discerned in FIG. 4, the connector half 2 includes a dielectric insert 16 extending from the region of ports 20 forwardly of shell 14 to end in an inwardly and outwardly beveled portion which serves to guide the connector half for insertion in the receptacle and guide a pin element of such receptacle within half 2. The shell 14 is indented very slightly in the region beneath spring 19 to lock the insert 16 to the shell. A rear dielectric element shown as 29 in FIG. 4 is provided to anchor the rear of the center contact member 18 of the connector half. The insert 29 is locked to the shell by indentations of the shell by bevels not shown. The rear of 29 is beveled to guide the conductor 6 within the center contact member 18. The center contact member 18 includes in its forward portion a spring section to receive a pin of a mating connector half. Its rear section defines a ferrule portion shown deformed in FIG. 4 to terminate 18 to the center conductor 6 of the cable. The ferrule portion is aligned with ports 20 for entry of dies to provide a crimping operation in a manner to be described. Adjacent the ferrule portion exteriorly of either end are small flanges 13 which bear against the dielectric material of the inserts 16 and 29 to lock 18 against axial displacement relative to such inserts and relative to shell 14. Insert 29 also operates as a stop fixing relative displacement of the cable dielectric sheath as it is inserted within the connector. The center contact 18 is preferably made of flat sheet stock rolled into a tubular configuration with weld spots being applied in the ferrule portion to maintain the integrity of such portion under crimping forces deforming the portion to terminate the center contact to the cable inner conductor 6. Reference may be had to the aforementioned O'Keefe et al. application for a more detailed disclosure of the center contact structure included in the weld ferrule portion and overall assembly of connector half 2.

The connector half 2 thus represents a preassembled coaxial connector with all of the various elements required for connecting latching and support functions held together in one piece, except for ferrule 24. As can be seen from FIG. 1, the invention contemplates the provision of a series of connector halves commonly orientated and precisely located by a suitable means such as a carrier strip formed of the material of which the outer shell of each connector is made. The orientation thus provided is most critical to high speed handling of multiple element connectors in that it facilitates termination procedures through common tooling made to address and accommodate each connector in an identical fashion. The strip 26 positions the connector halves with the ends of portions 22 in a line and the axes parallel to the required insertion axis of the cable. The strip 26 also positions the ports 20 of each connector half for entry of dies to crimp the rear ferrule portion of the contact element of each half to the cable inner conductor.

FIG. 5 shows a general arrangement of wire and connector processing apparatus illustrating the method of the invention. To the lower left of FIG. 5 can be seen the cut, but unstripped end of the coaxial cable 4 preparatory to insertion into a wire stripping apparatus 222. On the front portion of 222 is a ferrule loader 202 which installs a ferrule 24 on the unstripped end of the cable 4 as it is inserted into 222. A cable 4 properly stripped and having ae ferrule 24 thereon is next shown to the right prior to insertion within a connector applicator 30. The connector applicator includes a reel supply of connector halves 2 schematically depicted in FIG. 5, which are fed by means of the carrier strip 26 into a position within 30 where each connector half 2 is gripped and held with the carrier strip being severed and displaced to permit installation of a stripped cable carrying a ferrule thereon. To the right in FIG. 5 is shown a cable 4 having a connector half 2 terminated thereto.

The invention method will thus be seen to embrace the provision of a series of preassembled coaxial connectors or halves of a specialized construction to facilitate machine handling and simultaneous termination of inner and outer conductive portions to inner and outer conductive portions of a cable in conjunction with a cable dressing apparatus which provides a cable, properly stripped and loaded with the crimping ferrule for installation on a connector half and a further apparatus for separating the connector half from a carrier positioning such connector half and terminating such to the cable.

CONNECTOR FEED, POSITIONING AND CRIMPING APPARATUS

Referring now to FIGS. 6–10, a preferred form of the apparatus 30 in accordance with the invention comprises a base plate 32 which is suitably mounted on the platen 34 of a bench press having a reciprocable ram to which the ram 114 of the applicator is attached. The press may be of the general type disclosed in the U.S. patent to Kerns 3,343,398, and need not be further described here.

A support plate 36 is adjustably secured to, and mounted on, the upper surface of the base plate 32 by means of a fastener 38 which extends horizontally through the support plate 36 (FIG. 10) and is threaded into a block 42 secured by a fastener 44 to the base plate 32. The head 40 of the fastener 38 is disposed on the front surface of the support plate so that the support plate can be moved rightwardly and leftwardly as viewed in FIG. 10 for adjustment purposes. A feed platform 46 is disposed above the surface of the support plate 36 and is pivotally mounted at its lefthand end, as viewed in FIG. 6, on a flange 48 extending upwardly from the support plate 36. Feed platform 46 is normally biased upwardly and in a counterclockwise direction as viewed in FIG. 6 by means of a spring 54 (FIG. 10) which is interposed between the underside of support platform 46 and the upper surface of the support plate 36. The strip 26 carrying connector halves 2 is guided over the upper surface of the plate 46 by a guide bar 56 which overlies and which is secured to the feed platform by suitable fasteners 58. Strip 26 is also guided by means of retaining plate 60 secured to feed platform 46 by fasteners 62 which extends over the end portions of the terminals of the strip. A depending flange 64 of this retaining plate bears against the surfaces of connector halves 2 and holds them against the surface of an insert 72 in the upper surface of the feed platform. The rearward ends 22 of the connector halves (the lefthand ends as viewed in FIG. 10) and carrier strip 26 are supported on a ledge portion of the feed platform and a shoulder 74 defined by the end of this ledge bears the radially extending flange 21 of the connector halves.

A slight drag is imposed on strip 26 during feeding by a drag plate 76 mounted against the front side of the feed platform 46 by means of an eccentric 78 pivoted to the platform at 80. A flange portion of plate 76 which overlies carrier strip 26 is biased downwardly against the surface of 26 by means of springs 84 which surround screws 82 threaded into the flange portion of the plate 76. When it is desired to relieve this drag on the carrier strip, as when a new strip of connectors is being inserted into the apparatus, the lever on the eccentric 80 is merely rotated through one half of a revolution thereby to raise the drag plate against the biasing force of the spring 84.

The connector halves 2 are fed rightwardly as viewed in FIG. 6 by means of a feed finger 66 which projects through an elongated slot 68 in the guide member 56. This feed finger is integral with, and depends from, a laterally extending arm 86 (see FIG. 10) which is secured to an L-shaped mounting block 88. Mounting block 88, in turn, is fastened to the end of a slide member 90 having an adjustable pivotal connection 94 with the lower end of the feed lever 96, the adjustment of this connection being achieved by a suitable adjusting screw 92. It will be understood that adjustment of the location of this pivotal connection 94 is desirable for the purpose of changing the limits of the stroke of the feed finger. After the apparatus has been adjusted for a given connector strip, further adjustment of this pivotal connection is unnecessary.

The feed lever 96 is pivotally mounted intermediate its ends at 98 on a plate 100 which, in turn, is adjustably carried by a mounting plate 102 secured to the ram housing 104. The plate 100, and therefore the location of the pivotal connection 98, can be moved upwardly or downwardly as viewed in FIG. 6 by means of an adjusting screw 106 which is threaded through the plate 100, as shown in FIG. 6. Such adjustment of the location of pivot point 98 has the effect of changing the amplitude of the feed stroke so that the apparatus can be adapted for use with connector strips having varying pitches.

The upper end of the lever 96 has a pivotal connection (not specifically shown) with a slide member 108. This slide extends rightwardly as viewed in FIG. 6 towards the ram 114 and has a cam follower 110 on its end. This cam follower bears against an inclined cam surface 112 on the ram 114 so that during initial downward movement of the ram, the slide member 108 will be moved leftwardly thereby swinging lever 96 in a counterclockwise direction and advancing the feed finger 66 to feed the strip toward the operating zone. The lefthand end of the slide member 108 is slidably supported in an extension 120 of a support 118 integral with the base member 32. The support member 118 and an additional support member 116 support the ram housing 104.

The lever 96 is normally biased leftwardly, that is, in a clockwise direction, by means of a spring 124, one end of which is secured to the lever and the other end of which is secured to an arm 122 extending from, and secured to, the extension 120 of the support 118. It will thus be apparent that during initial downward movement of the ram, the lever 96 is swung through a counterclockwise arc to feed the connector strip and locate the leading connector half of the strip between the crimping dies and anvils which will be described below. During upward movement of the ram 114, the lever 96 is returned to its initial position by the spring 124.

Each connector half is crimped onto a cable by three crimping dies 138', 140', 142' mounted on the lower end of the ram 114 which cooperate with three anvils 138, 140, 142. These anvils are mounted in a anvil mounting block 126 contained in a recess 136 on the upper surface of plate 32. Block 126 is generally E-shaped having a side 128 and three spaced-apart arms 130, 132, 134, see FIGS. 7 and 15. The anvils 138, 140, 142 extend from the upper sides of anvil blocks 144, 146, and 148, respectively. Anvil block 144 is disposed above the upper surface of the arm 132 of the mounting block 126 and extends forwardly over the space between the arms 132 and 130. A guide arm 150 projects downwardly from the underside of anvil block 144 and has a sliding fit in the space between the arms 130, 132. The anvil blocks 146, 148 are mounted in side-by-side relationship in the space between the arms 132, 134 of the anvil mounting block 126. Blocks 146 and 148 are resiliently biased upwardly by springs 182, 184. The block 146 is retained in the die mounting block 126 by a shoulder 176 which extends beneath block 144. Block 148 is retained in the die mounting block by a cover plate 149 secured to the upper surface of the arm 134 and extending over the upper surface of block 148.

On its upper surface (see FIGS. 6 and 7) anvil block 144 has a pair of spaced-apart ears located rightwardly of the anvil 138 (as viewed in FIG. 6) which are pivotally connected at 156 to the forward end of the lever 154. Lever 154 extends rearwardly above the base plate 132 and has its other end pivotally connected at 158 to a block 160 which is integral with, and extends upwardly from, the plate 32. During downward movement of the ram 114, the lever 154 is engaged intermediate its ends by a depending depressor member 162 mounted on the ram. As shown in FIG. 7, this depressor member extends into a suitable recess in the ram and bears against a compression spring 164, this spring being relatively stiff so that upon downward movement of the ram 14, the lever will be swung in a counterclockwise arc about its pivotal axis 158 but after the lever has reached the limit of its clockwise movement (as will be described below), spring 164 is compressed and the depressor 162 recedes into the ram.

The anvil block 144 is normally biased upwardly by means of a spring 166 which bears against the underside of an extension of the anvil block and which extends into a recess in the tooling block. Upward movement of the anvil block 144 is limited by a laterally extending arm 168 of a retainer plate 170 secured to the front side of the block 126. At this lower end, this retainer plate 170 has an inwardly directed flange 172 by means of which it is fitted onto the tooling block. This retainer plate 170 is held against the surface of the tooling block by suitable fasteners which also hold a bracket for the cable inserting mechanism described below.

The block 144 has a leftwardly extending arm (FIGS. 6 and 15) which overlies the end of the feed platform 46. When block 144 is depressed, this arm causes the feed platform to swing downwardly about its pivot axis 52 for reasons explained below.

After the strip of connector halves has been fed a distance equal to the space between adjacent connectors the leading connector half terminal of the strip will be located, as shown in FIG. 11, above the anvils 140, 142 and with the carrier strip extending beneath the anvil support block 144 of the anvil 138. When the lever 154 is moved downwardly by depressor 162 the block 144 moves downwardly as viewed in FIG. 11 and the lefthand end of this block cooperates with the righthand side of the anvil 140 to shear the carrier strip at a location adjacent to the connector half, see FIG. 12. The lever 154 and the anvil block 144 continue to move downwardly until the underside of the carrier strip is pressed against a ledge 176 of the anvil block 146. As shown in FIG. 9, the anvil block 146 is supported on a relatively stiff spring 182 contained in the base plate 32. When the anvil block 144 moves against ledge 176, further downward movement of the block 144 also causes downward movement of the anvil block 146, the amount of such downward movement of latter anvil block being indicated by distance between opposed shoulders 180, 178 of the arm 132 and the anvil block 146, respectively.

As also shown in FIG. 9, the anvil 142 extends from an anvil block 148 which is mounted against the anvil block 146 and one side of the arm 134 of the tooling block. This anvil block, 148, is also biased upwardly by a spring 184 which bears against the base of the recess 136 of the plate 32 and which extends into a suitable opening on the lower end of the block 148.

The crimping anvils 139, 140, 142 cooperate with corresponding crimping dies 138', 140', and 142' mounted on the lower end of the ram 114. The dies 138', 140' are integral with plates 144', 146' which are mounted rigidly on the lower end of the ram. The die 142' is provided on the end of a plate 148' which is resiliently mounted on the lower end of the ram as indicated in FIG. 9. This resilient mounting of the die 142' is desirable for the reason that the connector half being applied to the end of the cable is gripped to be held by the anvil 142 and the die 142' while the end of the cable is being inserted into the connector. The connector half is also held in position by means of a retainer member 186 secured to the end of the ram and having a slot 188 which straddles the half.

The operation of inserting the end of the cable 4 into a connector half 2 held in the crimping tooling is assisted by means of an inserting mechanism mounted on an L-shaped bracket 190 (FIG. 9) which is secured to the block 126 against the previously identified plate 170. A slide member 192 is slidably supported on the upper surface of the bracket 190 and guided towards and away from the connector half held in the crimping tool by means of suitable ribs 196. Slide 192 has a block 194 on its lefthand end and a spring 200 interposed between the bracket 190 and this block normally biases the slide leftwardly as viewed in FIG. 9. The block 194 has a slot 201 on its upper side which is adapted to receive the cable 4. On the lefthand end of the slide, as viewed in FIG. 9, a pair of upstanding ears are provided which define an additional slot 198, the width of this slot being sufficient to receive the cable 4 but being sufficiently narrow to prevent reaward movement of the sleeve 24 on the cable. At the time of insertion, the cable is positioned in the slots 201, 198 and the slide 192 is moved rightwardly as viewed in FIG. 4 to insert the end of the cable into the connector half.

The operation of the disclosed embodiment requires that the ram move downwardly through a substantial portion of its operating cycle and then stop while the end of the cable is inserted into a connector as will be described below. This split cycle effect can be achieved in any desired manner; for example, where the press is of the crank-type as disclosed in the above-identified Kerns patent, a split cycle clutch mechanism can be provided between the crank of the press and the crank shaft. One suitable split cycle clutch mechanism, for example, is the Hilliard Type 4 two trip clutch manufactured by Hilliard Corporation of Elmira, N.Y.

The operation of the disclosed embodiment is as follows. At the beginning of the operating cycle the feed platform will extend substantially horizontally, and the feed finger will be in its retracted position, and the ram will be at the uppermost limit of its stroke. The operator first actuates the split-cycle clutch to cause the ram 114 to move downwardly through a substantial portion of its downward stroke. During this interval, lever 96 is swung through a counterclockwise arc about its pivotal axis 98 and the strip of connector halves is advanced to position the leading connector half between the crimping dies and the crimping anvils. This leading connector half will be fed above the surface of the anvil 140 but the carrier strip will be fed beneath the surface of the anvil block 144 as shown in FIG. 11. After the strip has been fed, the depressor 162 engages the lever 154 and causes the block 144 to move downwardly thereby shearing the carrier strip from the previously fed half. The underside of the block 144 moves against the ledge 176 of the block 146 so that further downward movement of the block 144 also causes downward movement of the block 146 and the anvil 140. During the final stages of the initial portion of the cycle, the block 146 and anvil 140 are moved downwardly thereby to provide clearance, as indicated in FIG. 12, for inward movement of the ferrule 24 as described below. When the block 144 is moved downwardly by lever 154 the horizontal arm 145 of block 144 also depresses the feed platform 46 so that the portion of the strip which extends beyond the righthand end of the feed platform follows the leading connector half until the leading connector half is sheared. After the leading connector half has been severed from the carrier strip, it is held by the die and anvil 140', 140 which move relatively through the slots 20 in the outer shell 14 of the connector half against the inner ferrule of 18. The leading connector half is also supported and held by the previously described retainer member 186.

After the initial downward movement of the ram has been completed, the technician operating the apparatus positions the previously prepared end of the cable in the slots 201, 198 with the sleeves 24 in front of the ears 198. He then pushes the slide member 192 rightwardly as viewed in FIG. 9 to insert the center conductor into the ferrule portion of 18 and to position the flared outer conductor 10 in surrounding relationship to the rear portion 22 of the connector half. He also moves ferrule 24 against flange 21 of the connector half so that the parts will be in the positions of FIG. 12. He then again energizes the split cycle clutch to drive the ram to the limit of its downward stroke whereby the dies and anvils will move relatively towards each other to the positions of FIGS. 13 and 14. During this final portion of the cycle the die and anvil 142, 142' crimp the inner ferrule portion of 18 onto the inner conductor 6 of the cable, the die and anvil 140, 140' crimp ferrule 24 onto the cable outer conductor 10 and onto the portion 22 of the connector half, and the die and anvil 138', 138 crimp the end portion of 24 onto the insulation 12 of the cable. After completion of the crimping operation the ram returns to its starting position displacing the die and anvil to the position of FIG. 14 and the finished crimped termination can be withdrawn from the operating zone.

It will be apparent from the foregoing description that the provision of coaxial connector terminals in strip form and the crimping of such terminals onto the ends of coaxial cables presents several problems which are not commonly encountered in terminal applicators. The split cycle of the applicator is desirable in order to sever the leading connector from the carrier strip and to give the operator an opportunity to insert the cable end into the connector half. It is also necessary to support the half in a manner such that the outer conductor of the cable can be positioned in surrounding relationship to the rearward end of the half and the ferrule 24 can be positioned in surrounding relationship to the outer conductor. It follows that the connector half, at this stage of the crimping cycle, can not be supported at its rearward end but must be otherwise supported. The present embodiment shows one means of achieving these requirements although other apparatus within the scope of the appended claims will be apparent to those skilled in the art.

It will be apparent that many of the principles of the invention apparatus might be used in hand tools for crimping coaxial connectors or terminals onto the ends of coaxial cables. For example, a hand tool might be provided having one die and anvil set which is adapted to hold the terminal without crimping it in a manner such that the cable can be inserted at an intermediate stage of the operating cycle. An arrangement of this type will facilitate the cable inserting operation which is tedious and difficult in many existing coaxial connector and terminal hand tools.

FERRULE LOADING AND CABLE STRIPPING APPARATUS

Referring now to FIGS. 16–29, one embodiment of apparatus for preparing the end of the cable 4 for attachment to a connector half 2 comprises a ferrule assembling means 220 which is mounted on a suitable support plate 224 in alignment with a cable end stripping device generally indicated at 222. The ferrule assemblying means is supported on the inclined upper surface of a pedestal 226 and comprises a base plate 228, a reciprocable slide 232 on the upper surface of the base plate, and a cover plate 230 secured to the base plate in straddling relationship to the slide. Slide 232 is leftwardly biased as viewed in FIG. 18 toward a flange 238 on the lefthand side of the base plate 228 by means of a spring 234. One end of this spring is secured to a pin which extends from the slide member through a slot 236 in the cover plate 230 and the other end of the spring is secured to a pin extending from the flange 238. A roller bearing 240 on the upper surface of the slide member bears against an inclined camming surface 242 of a camming block 244. This camming block is slidably supported on the surface of base plate 228 and is connected by means of an arcuate leaf spring 248 to the end of a control rod 246. The control rod extends rearwardly beside the stripping apparatus 222 and is supported in suitable guides 250 which are mounted against the sides of pedestals 252 extending from the base plate 224. An arm 256 is integral with, and extends laterally from, the control rod 246 intermediate its end and has a roller 254 on its end which is disposed in a track 258 of a collar 259. This collar is secured by means of pins 261 to a continuously rotating spindle which, during the operating cycle, moves axially towards and away from the ferrule assembling apparatus 220 as will be described below.

Referring particularly to FIGS. 18 and 22, the head portion 262 of the slide 232 has a semi-cylindrical pocket 270 which conforms to the diameter of the ferrules 23. When the slide member 232 is in its retracted position, this pocket is disposed beside, and in axial alignment with, a cylindrical opening 268 in an arm 264 which is integral with the cover plate 230. The individual ferrules 24 are delivered to the opening 268 and fed to a position in front of the head portion 262 of the slide 232 by means of a guide tube 266. The individual ferrules may be loaded into this guide tube by means of any suitable automatic loading device, for example, by means of a vibratory feeding unit or similar automatic feeding device. The leading ferrule 24 of the succession of ferrules being fed will thus be located as shown in FIG. 22 in front of the slide member and against a shoulder 271 at the end of the pocket 270 so that upon lateral movement of this slide member this leading ferrule will be fed laterally and will be held in axial alignment with the cable stripping device 222.

A block 274 is mounted on the support plate 230 in opposed relationship to the head portion 262 of slide 232, this block having a similar semi-cylindrical pocket 272 on its side which is opposed to the pocket 270. An additional block 276 is mounted on the support plate beside the block 274 and has an outwardly facing conical lead-in surface 278 for the cable, which is used to guide the cable into the apparatus and through the ferrule 24 to the cable stripping device. The head portion 262 of the slide 232 has a complementary conical surface 280, the arrangement being such that when the slide moves from the position of FIG. 22 to the position of FIG. 23 a circumferentially continuous conical lead-in surface is provided to guide the end of the cable through a ferrule 24.

After the end of the cable has been inserted through the ferrule which is clamped between the surfaces 270, 272, it is necessary to clamp the cable end while stripping and flaring operations are being carried out. Such clamping of the cable end is achieved by means of a movable clamping member 286 which is slidable mounted in a recess 284 of a fixed block 282 secured to the cover plate. As shown best in FIG. 24, upon movement of this movable clamping member 286 toward an inserted cable, the end portion of the cable is clamped and held firmly while the stripping operation is being carried out. The clamping member 286 is pivotally mounted in a clevis 288 on a lever 290. The lever 290, in turn, is pivotally connected intermediate its ends to a plate 292 extending from the pedestal 226 and the lower end of the lever is connected by means of a spring 294 to the plunger 296 of a solenoid 298. It will be apparent from FIG. 16 that when the solenoid 298 is energized the plunger 296 will move rightwardly in FIG. 6 thereby swinging the lever 290 in a counterclockwise direction about its pivotal axis and moving the movable clamping member from the position of FIG. 23 to the position of FIG. 24.

It is desirable to support the portion of the cable which is immediately adjacent to the stripping mechanism 222 against undue lateral deformation while the stripping and flaring operations are being carried out. Such support for the cable end is provided by means of a wire support arm 300 which extends laterally from the end of the control rod 246, and which has an opening 301 for reception of the cable. As best shown in FIG. 22, this opening is in axial alignment with the insulation stripping mechanism 222 and with the sleeve held in the ferrule feeding mechanism 202 so that upon insertion of the cable the cable will extend through the sleeve and through opening 301 into the stripping and flaring mechanism.

The previously identified spindle 260 is supported in, and extending through, a suitable bearing block 302 mounted on the support plate 224. The end of the spindle 260 extends beyond this bearing block and has a pulley 304 on its end which is coupled by a belt 306 to a suitable motor (not shown). The spindle is rotated continuously by this motor at a speed of about 800 to 900 r.p.m. As shown in FIGS. 19 and 20, the forward end of the spindle 60 is transversely milled to define a mounting platform 310 and a recessed face 312. An anvil 314 is secured to the platform 310 and has a semi-cylindrical upper surface 316, the radius of which is substantially equal to the radius of the cable and which is adapted to support the cable during the insulation cutting operations. Recesses 322 are provided intermediate the ends of the anvil on each side of the supporting surface 316 to provide clearance for the cutting blades as will be described below. A block 318 is secured to the face 312 of the spindle and has a conical guide surface 320 which functions to guide the end portion of an inserted cable against the support surface 316 so that the cable axis will coincide with the axis of the spindle during the insulation cutting operation.

Two separate cutting blades 324, 332 are provided for stripping the insulation from the end of the cable in a manner such that the center conductor and the shielding material will both be exposed after the stripping operation has been carried out. The blade 324 is secured by a fastener to the end of a mounting arm 326 which is disposed in an axially extending slot 332 in the spindle. The enlarged right-hand end of this arm (as viewed in FIG. 20) is received in a recess 330 at the inner end of slot 332 and is pivotally mounted on a pin 328 extending transversely through the spindle. As illustrated in FIG. 20, this blade is adapted to cut entirely through the outer insulation, through the shielding material, and through the insulating sheath 8 of the cable to expose the inner conductor 6. The outer cuttting blade 332 is secured to a strap member 338 which is integral with a pair of arms 336. The arms 336 straddle the arm 326 and are, like the arm 326, pivotally mounted in the transversely extending pivot pin 328. The blade 332 is dimensioned such that when the arms are moved downwardly into their cutting positions (FIG. 20) this blade will cut only through the outer protective sheath 12 of the cable to expose a portion of the cable outer conductor 10.

During continuous rotation of the spindle 260, these arms will normally be thrown radially outwardly and away from the spindle axis and, therefore, away from the cable by virtue of the centrifugal force. The arms are cammed inwardly to move the blades against the end of an inserted cable by means of a cam follower 340 mounted in recess 342 in a slidable camming collar 308. This collar is keyed as shown at 309 (FIG. 20) to the spindle 260, so that it will rotate with the spindle and is also permitted to move axially with respect to the spindle in order to accomplish camming of the arms 326, 336 toward the cable. As shown in FIG. 20, the upper sides of the arms 326, 336 against which the follower 340 bears are not identical, the contours of these sides being such that the arm 326 is moved downwardly and against the cable prior to movement of the arms 336 so that the cutting operation carried out by the blade 324 will be completed in advance of the cutting operation carried out by the blade 332. This arrangement is desirable in order to ensure complete circumferential cutting of the outer sheath 12, the outer conductor 10 and the inner insulation sheath 8 by the cutting blade 324. The cable must be stationary (rather than spinning with the spindle) while the cutting operation by the blade 324 is being carried out. If the cutting blade 332 were to cut through the outer sheath 12 prior to movement of the blade 324 against 12, the severed section of the outer sheath (severed by blade 332) might tend to spin with the spindle and the blade 324 would merely cut into the cable but would not move relatively around the spinning cable and a continuous circumferential cut would not be obtained.

The spindle 260 is moved axially toward the sleeve assembly device 220 by means of rollers 348 which are mounted on the ends of arcuate arms 350 extending from lever 352. The rollers 348 are disposed in the track 258 of the previously identified collar 259, this collar being secured to, and therefore, rotatable with spindle 260. The lever 352 extends transversely past a cam shaft 364 and has an enlarged end 356 which is pivotally mounted by means of a pin 354 on the base plate 224. Intermediate its ends, a roller 358 is mounted on the upper surface of the lever 352 and is received in a cam track 360 of a collar 362. The collar 362, in turn, is secured to the cam shaft 364 which extends beside and parallel to the spindle 260. Cam shaft 364 is mounted in suitable bearing blocks 366, 368 and extends rightwardly as viewed in FIG. 17, through a clutch housing 370, as shown in FIG. 21. It will be apparent that during rotation of the cam shaft 364, the lever 352 is swung about its pivotal axis 354 thereby to move the collar 259 and the spindle 260 axially toward and away from the ferrule assembling mechanism 220.

The camming collar 308 is moved relatively along the spindle 260, by means of rollers 432 which are disposed in a channel or groove 430 on the surface of the camming collar 308. These rollers are mounted on the ends of arcuate arms 434 which extend from a lever 436 having an enlarged end 440 which is pivoted at 438 to the support plate 224. Intermediate its ends, the lever 436 has a roller 442 on its upper side which is received in a camming slot 446 of a collar 448. This collar is mounted on, and secured to, the cam shaft 364. Again, during the rotation of the cam shaft, the lever 436 will be swung about its pivotal axis 438 thereby to move its end portions toward and away from the ferrule assembling mechanism 220. The timing of the movement of this collar is described in the timing diagram (FIG. 29) and is discussed in further detail below.

A complete operation cycle of the mechanism encompasses a complete revolution of the cam shaft 364, however, the cycle is interrupted as shown on the timing diagram and as discussed below, after the spindle 260 is moved relatively leftwardly in FIG. 17 and its end is disposed ajacent to the ferrule assembling mechanism. This interruption of the cycle is achieved by means of the clutch mechanism which will now be described with particular reference to FIG. 21. As shown in FIG. 21, a collar 376 is mounted on, and keyed to the shaft and has a generally spiral surface defining a notch or shoulder 378. At the beginning of the operating cycle, the shoulders 378 is disposed against a tooth 381 of a lever 380, the end of this lever being pivotally mounted at 382 on a support block 384. The upper end of the lever 380 is pivotally connected at 386 to a link 388 which, in turn, extends to the plunger 390 of a solenoid 392 mounted on the upper surface of the bearing block 302. It will be apparent then that when the solenoid 392 is energized the link 380 will be swung through a slight counterclockwise arc as viewed in FIG. 21, thereby disengaging the tooth 381 from the shoulder 378 and permitting the shaft 364 to rotate. The rotation of the shaft 364 is, however, arrested or interrupted shortly after the movement of the tooth 381 away from the shoulder 378 by means of a second stop member 396 having a tooth 394 on its upper end which is also adapted to engage the shoulder 378. The lever 396 is pivoted at 398 to the block 384 and is pivoted at its lower end 400 to a link 402. The link 402, in turn, is pivotally connected to the plunger of a solenoid 404. The interrupted cycle can thus be continued by energizing the solenoid 404 to disengage the tooth 394 from the shoulder 378. The shaft 364 is connected by a conventional slip clutch (not specifically shown) to a continuously rotating sprocket 372, which, in turn, is coupled by a chain 374 to a relatively low speed power source such as a speed reducer coupled to an electric motor. The speed of rotation of the sprocket 372 is relatively low as compared with the speed of rotation of the spindle 260, for example, 30 r.p.m.

After the sheath 8 and a portion of 10 has been stripped from the end of the cable, that is, after the cable has been prepared as shown in FIG. 26, the exposed section of 10 is outwardly flared by means of a pair of arms 406, 408, which will not be described.

Referring to FIG. 19, the rearward ends of these arms 406, 408 extend into recesses 410 in the sides of the spindle 260 and are pivotally mounted on parallel spaced-apart pivot pins 412 extending through the spindle on each side of the axis thereof. The forward ends of the arms 406, 408, extend beyond the end of the spindle and have inwardly directed cable gripping fingers 414, 416. During normal rotation of the spinle and while the camming collar 308 is in the position of FIG. 23 or 24, these arms will be swung outwardly by centrifugal force. The arms are cammed inwardly by relative movement of the camming collar 308 with respect to the spindle, as will be described below.

The end of the wire gripping finger 416 of the arm 408 is notched on its forward side, as shown at 418 and the corresponding end of the wire gripping finger 414 of the arm 406 is pointed as shown at 420. On the rearwardly facing side of the gripping finger 414 of arm 406, however, there is provided a notch 420' while on the rearwardly facing side of the gripping finger 416 of arm 418, there is provided an inclined pointed section which is adapted to enter notch 420'. The ends of the fingers 414, 416 are additionally provided with cylindrical recesses or pockets 421, 421' at the roots of the notches 418, 420', and extending across the apices of the pointed sections 420, 418'. The radius of these recesses is somewhat greater than the radius of the inner conductor 6 so that the inner conductor will be confined, but not tightly gripped, when the fingers are against each other.

During the forward movement of the camming collar 308 relative to the spindle 260, the arms 406, 408 are cammed inwardly by means of rollers 421 (FIG. 16) mounted in recesses in the camming collar and adapted to bear against the outwardly facing edges of the arms. These outwardly facing edges of the arms are provided with protrusions, 422 on the arm 406 and 424, 426 on the arm 408, which function to time the inward movement of the arms. Particularly, the protrusion 422 is located such that the arm 406 will move inwardly in advance of inward movement of the arm 408 but will then move radially outwardly as the camming collar moves and the roller 421 is moved beyond the protrusion 422. The arm 408 is subsequently moved inwardly by virtue of the inclined contour surfaces 424, 426.

The locations and contours of these protrusions are such that the arms move inwardly toward each other and grip the center conductor of the cable at the beginning of the flaring operation. Subsequently, the arm 408 is moved further inwardly so that the end of the center conductor is located off-center with respect to the cable axis, see FIG. 27. The rotation of the spindle while the center conductor is thus gripped causes the inner insulating sheath 8 to be twirled relative to the cable axis and thereby move the outer conductor 10 outwardly until it is separated or flared, as viewed in FIG. 28.

The operation of the disclosed embodiment will be apparent from the foregoing description taken in conjunction with the timing diagram, FIG. 29. At the beginning of the operating cycle, the parts will be in the position of FIGS. 17 and 22 with the spindle 260 in its retracted position and with the cutting blades and the arms 406, 408 in their open positions. The operator first energizes the solenoid 392 thereby to cause shaft 364 to rotate through an angle of about 30°. The rotation of the shaft 364 acutates arcuate slide 232 and positions a sleeve between the conical gripping surfaces 270, 272 in alignment with the opening in the block 282. After this limited rotation of shaft 364, the shoulder 378 moves against the tooth 394 of the arm 396 and the shaft 364 comes to rest.

During this initial portion of the operating cycle the spindle 260 is moved forwardly by the action of the cam track 360 and the front end of the spindle is positioned adjacent to the support arm 300 so that the parts occupy the positions of FIG. 23. While the cam shaft 364 is at rest, that is the cycle interruption, the operator inserts the end of an unstripped cable through the sleeve held between the gripping surfaces 270, 272 through the opening 301 in the support arm 300 and against the face of the spindle. The end portion of the cable will thus be supported on the conical support surface 316 of the anvil 314. The operator then energizes the solenoids 404 and 298 by closing a suitable switch (not shown) thereby to disengage the tooth 394 from the shoulder 378 thus permitting the cam shaft 364 to be driven through the remaining portions of a complete revolution and clamp the inserted cable by clamping block 286. During rotation of the cam shaft, the camming collar 308 moves forwardly thereby to urge the arms 326, 336 downwardly and move the blades against the surface of the cable. The camming collar 308 dwells in its forward position for a brief interval to assure complete circumferential cutting of the cable by both blades. As pointed out previously, during this interval the blade 332 cuts only through the outer insulating sheath of the cable while the blade 324 cuts through the outer insulating sheath, the shielding material, and through the inner insulation sheath. The camming collar and spindle then retract to its positions shown in FIG. 24. At this time in the cycle the end of the spindle will be relatively remote from the sleeve assembling apparatus and the inwardly directed ends of the arms 406, 408 will be disposed on each side of the exposed end of the inner conductor 6. The camming collar is then moved leftwardly from the position of FIG. 24 to the position of FIG. 25 under the the influence of the cam track 446 to close the arms 406, 408 and confine the end of the exposed inner conductor 6. As previously noted, the camming protuberances 442, 424, 426 on the outwardly facing edges of these arms are such that when the camming collar moves to the limit of its forward motion the end of the inner conductor 6 is held slightly off-center with respect to the cable axis. With the end of the inner conductor thus held, the continuous rotation of the spindle has the effect of twirling the inner conductor along a circular path surrounding the cable axis. As illustrated in FIGS. 26 and 27, the inner conductor carries with it the inner insulating sheath as it moves along this circular path and pushes the shielding material outwardly thereby deforming it to produce the generally conical flare illustrated in FIG. 28. As illustrated in the timing diagram, this twirling takes place for an interval encompassing about 100° of rotation of the cam shaft 364. At the conclusion of this twirling operation the camming collar 308 is retracted under the influence of the cam track 446 and the parts assume the position shown in FIG. 22. The solenoid 298 is de-energized by a suitable trip-switch (not specifically shown) thereby to release the cable from the clamping blocks and the cable can be withdrawn through the opening 301 and through the opening in the block 282. The sleeve through which the cable is originally inserted remains on the cable so that a prepared cable end as shown in FIG. 28, results.

A salient feature of the invention is the provision of the means for flaring the exposed shielding material on the cable end concomitantly with stripping of the insulation and a portion of the braiding material from the cable end. It will be apparent from FIG. 28 that the sleeve could not be moved onto the cable after flaring of the shielding material and an additional important feature of the invention is thus the means for assembling this sleeve to the cable prior to stripping of the insulation and flaring of the braiding material.

A further important feature of the invention is the provision of the different camming surfaces on the upper sides of the arms 326, 336 which results in cutting of the insulation by the blade 324 through the cable to the inner conductor prior to cutting of the outer insulation sheath by the blade 332. This construction prevents the section of insulation, braiding, and inner insulation which is severed by the blade 324 from rotating with the spindle and also prevents other portions of the cable from rotating with the spindle thus assuring complete circumferential cutting of the outer insulating sheath by the blade 332.

Turning now to an alternative embodiment of the stripping apparatus of the invention, FIGS. 30–34 depict structure added to the insulation stripping mechanism 222. The alternative embodiment is useful with cable having either a particularly fine or fragile center conductor which might be damaged by the twirling operation. To avoid such damage the insulating sheath 8 is left on the cable to be gripped by fingers 414, 416 rather than having such fingers grip the cable conductor 6 during the twirling operation. Thereafter the end portion of the sheath 8 is stripped off as a final step in the cable dressing operation.

FIG. 30 shows the stripping mechanism with the blades 324 and 332 extended outwardly and an additional blade 351 fitted on an additional arm 349 mounted on shaft 328. The arm 349 includes an inclined contour surface 353 positioned to be engaged by 340 to drive 351 into the position shown in FIG. 31. The arms 336 and 349 include relieved portions 333 and 355, respectively, to permit 340 to operate against surface 346 of arm 326 at an appropriate time of the stripping cycle. As one additional modification a shim 317 has been added to 266 in a position to stop the insertion of an unstripped cable, as shown in FIG. 30. This shim can be readily replaced by shims of other thicknesses to precisely adjust the axial position of the cutting blades relative to the cable end.

The operating cycle for the alternative version of the stripper apparatus includes a first step of positioning a cable as in FIG. 30, driving collar 308 to move forwardly, forcing 340 to drive arms 336 and 349 to the position of FIG. 31. Blade 332 is driven to cut through the cable outer insulating sheath 12 in the manner previously described. Blade 351 bites through the cable braid 10, but not the cable sheath 8. Rotation of the blades cuts off segments of 10 and 12. At this time the mechanism operating to retract spindle 260 draws the collar 308 and the cutting blades to the right as shown in FIGS. 32 and 33, pulling the cut segments of 10 and 12 off the cable.

The gripping fingers 414, 416 are then driven in the manner previously described to grip the cable as shown in FIG. 33, gripping in this embodiment the sheath 8 and not the wire 6. The cable is twirled as before to separate or flare braid 10.

At this time the operating cycle is modified to cause collar 308 to be retracted to relax the gripping fingers 416 and open the cutting blades. Now spindle 260 is advanced to the proper position to position the cutting blade 324 overlying the cable sheath 8. Collar 308 is than advanced to the position of FIG. 35 to cause 324 to cut the sheath 8, the entire blade assembly then being retracted to the position of FIG. 35, in the process removing the cut segment of sheath 8. The mechanism is then retracted to its relaxed position opening 286 and the dressed cable is removed from the apparatus.

The foregoing change in operation cycle is accomplished with essentially the same mechanism disclosed relative to the first embodiment, with an appropriate change in shape of the surface 360 and 446 of the cam tracks.

In the foregoing description the invention apparatus and method have been illustrated relative to a specific connector construction. The invention method contemplates applicability with connectors of similar construction mounted in parallel and commonly oriented by other types of carriers or means to convey connectors to the positioning and terminating apparatus.

The invention also contemplates use of the several aspects of the method in terms of arrangement, treatment of multipart connectors which are carrier in series, substantially preassembled and commonly oriented, gripped and separated from a carrier and then terminated with respect to variations in both cable and/or connector design. In the illustrative embodiment the cable disclosed is one including a center conductor of stranded wire surrounded by a dielectric sheath and a braid of conductive wires uncovered by an insulating sheath. Coaxial cables having solid center conductors are sometimes used and coaxial cables having outer conductors other than braid are sometimes employed. Cables having an outer conductor or foil or thin metal in the form of tubing or an electro-deposited metal are known. Cable having a signal conductor and an auxiliary conductor wrapped therearound, referred to as twisted pair cable, is rather widely used. Some cables have a particularly fine stranded center conductor which is relatively fragile. Other types of cable place the signal conductor in an insulating medium with grounding or shielding conductors laid in parallel thereto. Cables of the foregoing types may require changes in the termination technique from a straightforward crimping of inner and/or outer ferrule elements by dies coaxially arranged to crimp axially spaced segments to an arrangement wherein one or both die sets are driven in a side-by-side relationship to separately terminate ferrule portions of a connector which are spaced apart, in parallel, but not necessarily coaxial. In certain applications it it may be necessary to utilize sources of heat in lieu of dies to effect a flow or reflow of solder, either previously applied to one or both of the connector ferrule portions or to portions of the cable as by fluxing and tinning the stripped and bared ends of the cable prior to insertion within a connector. The invention fully contemplates the use of welding electrodes in lieu of one or both of the die sets shown to effect a welding of the separate conductive elements of the connector to the separate conductors of a cable.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What we claim is:

1. In a method for rapidly terminating electrical cable of the type having at least two conductors separated by an insulating material and commonly covered by an insulating sheath the steps including providing a series of connectors each substantially manufactured into a finished condition and preassembled into a unitary and mechanically functional structure defined by a pair of spaced and parallel contact elements separated electrically by an insulating material with each element including a forward mating portion and a further portion adapted to receive at least one conductor of the cable and providing carrier means linking the series of connectors together in a common orientation, driving and indexing the said carrier to position at least a leading connector in a termination station and gripping the positioned connector in a region apart from the said mating portion, preparing a cable by removing portions of the insulating sheath and insulating material thereof at the ends of the conductors and displacing the ends of the conductors relatively apart to provide a separation of the ends substantially aligned with the contact elements of a connector relative to the said further portions, inserting the bared ends of said conductors in or on said further portions and then terminating said portions to said conductors.

2. In a method for rapidly terminating electrical cables of the type having at least a signal conductor and grounding or shielding conductor separated by an insulating material and commonly covered by an insulating protective sheath the steps comprising providing a series of multipart connectors, at least one for each cable with each connector being essentially preassembled to form a unitary structure including at least a pair of contact elements separated by an insulating medium with front end portions positioned for functional use and with each contact element including a rear portion adapted to receive a conductor of a cable and held spaced apart by said structure to substantially maintain the electrical characteristics of said cable, mounting the preassembled connectors of said series on a carrier means with the rear portions of the contact elements of each connector being commonly oriented, feeding the carrier means to position at least the leading connector at a termination station and gripping the positioned connector, dressing at least a cable and preparing such for installation on a positioned connector by stripping portions of the insulating sheath and material from the cable end and separating the conductors thereof to align such approximately with the rear portions of the contact elements of the connector and then placing the bared ends of the conductors within or on the rear portions of the contact elements and terminating the conductors thereto.

3. In a method for rapidly terminating electrical cables of the type having at least a signal conductor and a further conductor separated by an insulated material and commonly covered by an insulating sheath the steps including providing a series of connectors each preassembled into a unitary structure to include a signal contact element and a further contact element separated by an insulating material, each contact element having a conductor receiving portion spaced apart by said dielectric material to substantially maintain the electrical characteristics of the cable, providing means to join the series of connectors together with a common orientation of rear portions, driving the series of connectors to present at least one connector at a termination station, stripping at least one cable for the connector by removing portions of the insulating sheath and insulating material to expose portions of the conductors and then separating the conductors to an extent to facilitate installation of said conductors into or on the conductor receiving portions of the contact elements of the connector and then installing the exposed portions of the conductors in or on said conductor receiving portions with the signal conductors in or on the signal contact element and the further conductor in or on the further contact element and terminating the receiving portions thereto.

4. In a method for rapidly terminating electrical cables of the type having at least a signal conductor with a further conductor in a surrounding relationship spaced therefrom to provide a ground or shielding path the steps including providing a series of multipart connectors preassembled to define functioning connector portions for mating with other connectors, each connector including a signal contact element including a portion adapted to receive the signal conductor of a cable and a further contact element including a portion adapted to receive the further conductor of a cable for termination thereto, the further contact element being separated from and in surrounding relationship to the signal contact element to provide a grounding and shielding function, providing means mounting the series of connectors to commonly orient the conductor receiving portions and driving the said means to position at least a leading connector at a termination site, gripping the positioned connectors to hold the conductor receiving portion in a position of access, preparing a cable for a connector at said terminating site by removing portions of the insulating material and insulating sheath and then holding one of said conductors and moving the body of said cable relative thereto to displace the other of said conductors to position of general alignment providing a spacing between the ends of said conductors approximating the separation of the portions of said contact elements and positioning said ends of said conductors in said portions of said contact elements and terminating the same thereto.

5. In a method for rapidly terminating electrical cables of the type having at least two conductors separated by an insulating medium, which conductors are commonly covered by an insulating sheath the steps including providing a series of connectors each having a pair of contact elements electrically separated by insulating material with each contact element including a portion adapted to receive one of the two conductors of a cable, with each connector being preassembled into a unitary structure and linked together by a common carrier means in a common orientation relative to the conductor receiving portions of the contact elements, driving said common carrier to position a leading connector in a die work station and then gripping but not crimping the leading connector with crimping dies driven to engage at least one conductor receiving portion of a connector, thereafter separating the gripped connector from the carrier means, stripping a cable and inserting the stripped end of the cable into the gripped connector with the conductors thereof being separately positioned in or on the conductor receiving portions of the contact elements thereof, and then driving crimping dies to deform at least a gripped portion to permanently terminate the connector to the cable.

6. The method of claim 5 wherein each connector includes a ferrule means and one of said conductors is positioned on a conductor receiving portion within said ferrule element, the said last mentioned step including driving crimping dies to deform said ferrule means to permanently terminate said one conductor to said connector.

7. The method of claim 6 wherein said ferrule means is initially separate from a connector and is placed on said cable prior to the stripping of said cable.

8. In a terminating system for a high frequency cable having
a signal conductor accurately spaced by an insulating medium from an auxiliary or ground plane conductor,
  (a) a plurality of connector subassemblies each comprising an axially arranged electrical contact section and a cable attaching section which latter section includes a pair of attachment elements arranged respectively to receive said signal conductor and auxiliary conductor, said elements having an electrical spacing to approximate the spacing of the cable conductors.
  (b) a cable attaching station,
  (c) a carrier supporting said subassemblies in a coaxial array, and including indexing means arranged to convey said subassemblies sequentially to said cable attaching station,
  (d) a cable dressing station including means to expose and space the end segments of said signal and auxiliary conductors for disposition into attaching relation with said attachment elements,
  (e) an inserter mechanism having means to receive dressed cable and to guide the relative advancement of the end segments thereof into attaching relation with the pair of attaching elements disposed at said attaching station,
  (f) a joining mechanism having members movable into said cable attaching station in cyclical cooperation with said indexing means and said inserter mechanism to electrically and mechanically affix said cable end segments to the attachment elements of the leading connector subassembly,
  (g) and means adjacent said cable attaching station operable to separate the leading connector subassembly from said carrier.

9. In a terminating system for a high frequency cable having
a signal conductor accurately spaced by an insulating medium from an auxiliary or ground plane conductor,
  (a) a plurality of connector subassemblies each comprising an axially arranged electrical contact section and a cable attaching section which latter section includes a pair of attachment elements arranged respectively to receive said signal conductor and auxiliary conductor, said elements having an electrical spacing to approximate the spacing of the cable conductors,
  (b) a cable attaching station,
  (c) a carrier supporting said subassemblies in a coaxial array, and including indexing means arranged to convey said subassemblies sequentially to said cable attaching station,
  (d) a cable dressing station including means to expose and space the end segments of said signal and auxiliary conductors for disposition into attaching relation with said attachment elements,
  (e) an inserter mechanism having means to receive dressed cable and to guide the relative advancement of the end segments thereof into attaching relation with the paid of attaching elements disposed at said attaching station,
  (f) a binder element constructed to press and maintain said auxiliary conductor onto the attachment element therefor,
  (g) a joining mechanism having members movable into said cable attaching station in cyclical cooperation with said indexing means and said inserter mechanism to electrically and mechanically affix said cable end segments to the attachment elements of the leading connector subassembly and including means to apply said binder element,
  (h) and means adjacent said cable attaching station operable to separate the leading connector subassembly from said carrier.

10. A terminating system in accordance with claim 9 wherein said cable is a coaxial transmission line, said binder element is a ferrule, and said cable dressing station includes means to slip a ferrule over each cable end.

References Cited

UNITED STATES PATENTS

| | | | |
|---|---|---|---|
| 3,359,780 | 12/1967 | Kerns | 29—203 |
| 3,376,627 | 4/1968 | Sitz | 29—203 |
| 3,416,213 | 12/1968 | Cootes | 29—203 |
| 3,500,013 | 3/1970 | Suel | 29—630X |
| 3,500,296 | 3/1970 | O'Keefe | 29—630X |

WAYNE A. MORSE, Primary Examiner

U.S. Cl. X.R.

29—203, 208, 241, 433